US012799283B2

(12) United States Patent
Ota et al.

(10) Patent No.: US 12,799,283 B2
(45) **Date of Patent: *Nov. 17, 2026**

(54) WATER-ABSORBING RESIN

(71) Applicants: NAGASE & CO., LTD., Osaka (JP); NAGASE CHEMTEX CORPORATION, Osaka (JP); Nagase Viita Co., Ltd., Okayama (JP)

(72) Inventors: Kusuo Ota, Tokyo (JP); Takahiro Nozaki, Tokyo (JP); Atsushi Tanaka, Tokyo (JP); Tetsuya Hosomi, Hyogo (JP); Tomoyuki Nishimoto, Okayama (JP); Manabu Miyata, Okayama (JP)

(73) Assignees: Nagase & Co., Ltd., Osaka (JP); Nagase ChemteX Corporation, Osaka (JP); Nagase Viita Co., Ltd., Okayama (JP)

(*) Notice: Subject to any disclaimer, the term of this patent is extended or adjusted under 35 U.S.C. 154(b) by 475 days.

This patent is subject to a terminal disclaimer.

(21) Appl. No.: 18/553,129

(22) PCT Filed: Mar. 31, 2022

(86) PCT No.: PCT/JP2022/016427

§ 371 (c)(1),
(2) Date: Sep. 28, 2023

(87) PCT Pub. No.: WO2022/211005

PCT Pub. Date: Oct. 6, 2022

(65) Prior Publication Data

US 2024/0199821 A1 Jun. 20, 2024

(30) Foreign Application Priority Data

Mar. 31, 2021 (JP) ................................ 2021-061023

(51) Int. Cl.
*C08J 3/075* (2006.01)
*C08J 11/10* (2006.01)

(52) U.S. Cl.
CPC ............... *C08J 3/075* (2013.01); *C08J 11/10* (2013.01); *C08J 2303/02* (2013.01)

(58) Field of Classification Search
CPC .................................................. C08B 31/006
See application file for complete search history.

(56) References Cited

U.S. PATENT DOCUMENTS

| | | | | |
|---|---|---|---|---|
| 4,321,364 | A | 3/1982 | McCleary | |
| 5,079,354 | A | 1/1992 | Gross et al. | |
| 5,247,072 | A | 9/1993 | Ning et al. | |
| 6,063,914 | A | 5/2000 | Wolf et al. | |
| 6,723,797 | B2 * | 4/2004 | Fujii | C08K 5/053 252/182.13 |
| 8,461,129 | B2 * | 6/2013 | Bolduc | C08B 30/00 536/108 |
| 2014/0113821 | A1 | 4/2014 | Gu et al. | |
| 2015/0246992 | A1 | 9/2015 | Ueda et al. | |
| 2018/0318149 | A1 | 11/2018 | Tsuji et al. | |

FOREIGN PATENT DOCUMENTS

| | | |
|---|---|---|
| CN | 101985487 | 3/2011 |
| CN | 102850706 | 1/2013 |
| CN | 103772514 | 5/2014 |
| CN | 108220363 | 6/2018 |
| CN | 108456256 | 8/2018 |
| EP | 0 104 780 | 4/1984 |
| JP | 59-31699 | 2/1984 |
| JP | 59-39300 | 3/1984 |
| JP | 60-55522 | 12/1985 |
| JP | 61-95006 | 5/1986 |
| JP | 5-214001 | 8/1993 |
| JP | 10-212302 | 8/1998 |
| JP | 2002-504508 | 2/2002 |
| JP | 2003-048997 | 2/2003 |
| JP | 2005-075815 | 3/2005 |
| JP | 2006-328346 | 12/2006 |
| JP | 2007-222704 | 9/2007 |
| JP | 2010-504414 | 2/2010 |
| JP | 2012-012462 | 1/2012 |
| JP | 2012-012549 | 1/2012 |
| JP | 2017-523277 | 8/2017 |
| JP | 2018-009076 | 1/2018 |
| JP | 2019-056071 | 4/2019 |
| TW | 201634061 | 10/2016 |

(Continued)

OTHER PUBLICATIONS

Lawal, O. S. et al., European Polymer Journal, "Hydrogels based on carboxymethyl cassava starch cross-linked with di- or polyfunctional carboxylic acids: Synthesis, water absorbent behavior and rheological characterizations", 2009, vol. 45, pp. 3399-3408 (Year: 2009).*
Mohamood, N. et al., Chemistry Central Journal, "Preparation, optimization and swelling study of carboxymethyl sago starch (CMSS)-acid hydrogel", 2018, vol. 12, 133, 10 pages (Year: 2018).*
Yoshimura, T. et al., Carbohydrate Polymers, "Synthesis and characterization of biodegradable hydrogels based on starch and succinic anhydride", 2006, vol. 64, 345-349 (Year: 2006).*

(Continued)

*Primary Examiner* — Bahar Craigo
(74) *Attorney, Agent, or Firm* — HSML P.C.

(57) ABSTRACT

The present invention provides a water-absorbing resin that is excellent in water absorption performance and is easy to be degraded. The present invention relates to a water-absorbing resin, which is a crosslinked product of a glucose polymer and forms a physical gel upon absorption of water, wherein the glucose polymer is a starch or a partially degraded starch, with an acidic group introduced therein.

20 Claims, 2 Drawing Sheets

(56) References Cited

FOREIGN PATENT DOCUMENTS

| | | |
|---|---|---|
| WO | 99/43305 | 9/1999 |
| WO | 2008/037082 | 4/2008 |
| WO | 2016/004974 | 1/2016 |

OTHER PUBLICATIONS

Krochta, et al., "Degradation of Polysaccharides in Alkaline Solution to Organic Acids: Product Characterization and Identification", Journal of Applied Polymer Science, vol. 33, No. 4, Mar. 1987, pp. 1413-1425.
Starch Chemistry Handbook, Asakura Publishing Co., Ltd., 1978, pp. 520-521—see the English translation of the Written Opinion of the International Searching Authority listed below, for a concise explanation.
Pfeiffer, et al., "Starch Derivatives of High Degree of Functionalization 5. Stepwise Carboxymethylation of Amylose", Chem. Pap. 56(4) 261-266 (2002).
Written Opinion of the International Searching Authority issued in PCT/JP2022/016403 (translation), Jun. 28, 2022, 14 pages w/translation.
Boonna, et al., "Macromolecular characteristics and fine structure of amylomaltase-treated cassava starch", Carbohydrate Polymers, vol. 206, pp. 143-150, Oct. 15, 2018 published online, 8 pages.
Karim, et al., "Dual Modification of Starch via Partial Enzymatic Hydrolysis in the Granular State and Subsequent Hydroxypropylation", J. Agric. Food Chem., vol. 56, No. 22, pp. 10921-10907, 2008.
Wang, et al., "Effects of substitution degree and molecular weight of carboxymethyl starch on its scale inhibition", Desalination, vol. 408, pp. 60-69, 2017.
Wilpiszewska, etl al., "Water-Soluble Pressure-Sensitive Adhesives Containing Carboxymethyl Starch with Improved Adhesion to Paper", J Polym Environ, vol. 26, pp. 1453-1458, Jun. 13, 2017 published online.
Zhang, et al., "Oxidized high-amylose starch macrogel as a novel delivery vehicle for probiotic and bioactive substances", Food Hydrocolloids, 114 (2021) 106578, Dec. 30, 2020 published online.
Das, et al., "Modified biopolymer-dextrin based crosslinked hydrogels: application in controlled drug delivery", RSC Adv., 2015, 5, 25014-25050.
Grace, et al., "Hydrolyzation of Edible Starches: Their Preparations and Properties" Materials Science Forum, vol. 875, pp. 63-76, Oct. 2016.

* cited by examiner

WATER-ABSORBING RESIN

TECHNICAL FIELD

The present invention relates to a water-absorbing resin.

BACKGROUND ART

Water-absorbing resins are widely used in various fields such as hygiene products, foods, agriculture and forestry, and civil engineering. As such water-absorbing resins, partially neutralized salts of polyacrylic acids and polymethacrylic acids are widely used, and water-absorbing resins made from polysaccharides such as a starch are known.

Patent Literature 1 discloses a method for producing a water-absorbing resin by heat drying a carboxyalkylated starch, to crosslink one starch with another.

Patent Literature 2 discloses a method for producing a water-absorbing resin by subjecting carboxyalkylated polysaccharide particles to surface treatment with a non-crosslinking acid such as hydrochloric acid, followed by heat drying or exposure to a crosslinking agent, to crosslink one polysaccharide with another.

Patent Literature 3 discloses a method for producing a water-absorbing resin by irradiating a mixture of a carboxymethyl starch and a starch, with ionizing radiation to form a crosslinked structure.

CITATION LIST

Patent Literature

Patent Literature 1: U.S. Pat. No. 5,079,354
Patent Literature 2: JP 2010-504414 T
Patent Literature 3: JP 2003-48997 A

SUMMARY OF INVENTION

Technical Problem

Conventional water-absorbing resins made from polysaccharides have not been easily degraded because the internal crosslinked structure is formed by an ester bond or an ether bond, and therefore have had a problem that the environmental burden at the time of disposal is high. An object of the present invention is to provide a water-absorbing resin that is excellent in water absorption performance and is easy to be degraded.

Solution to Problem

The present inventors have focused on the internal crosslinked structure of a water-absorbing resin, and have completed the present invention. The present invention relates to a water-absorbing resin, which is a crosslinked product of a glucose polymer and forms a physical gel upon absorption of water, wherein the glycose polymer is a starch or a partially degraded starch, with an acidic group introduced therein.

When the water-absorbing resin is suspended in an aqueous solution of 1% sodium hydroxide so that the final concentration of the water-absorbing resin is 5% by weight, and stirred for 60 minutes, followed by sieving it through a sieve having an opening of 500 μm, the dry weight of the water-absorbing resin remaining on the sieve is preferably less than 2% by weight of the dry weight of the water-absorbing resin contained in the aqueous solution.

The water-absorbing resin preferably has no internal crosslinked structure via an ether bond or ester bond.

The water-absorbing resin preferably has no internal crosslinked structure via a covalent bond.

The acidic group is preferably an acidic group having a carboxyl group or a sulfonyl group.

The acidic group preferably is a carboxyalkyl group, a carboxyalkenyl group or a sulfoalkyl group.

The acidic group is preferably a carboxymethyl group, a carboxyethyl group, a carboxyethenyl group or a sulfoethyl group.

The water-absorbing resin preferably has the following characteristics:

(a) a water absorption rate under no pressure for ion-exchanged water is 100 to 400 g/g;

(b) a water retention rate for ion-exchanged water is 80 to 300 g/g;

(c) a water absorption rate under no pressure for physiological saline is 20 to 70 g/g; and/or (d) a water retention rate for physiological saline is 7 to 60 g/g.

The water-absorbing resin preferably has a ratio (A/B) of the water absorption rate under no pressure for ion-exchanged water (A) to the water absorption rate under no pressure for physiological saline (B) of 7 or less.

The content of water and/or hydrophilic solvent in the water-absorbing resin is preferably 0.1 to 10%.

The present invention also relates to a method for degrading the water-absorbing resin, comprising subjecting the water-absorbing resin to alkali treatment.

The present invention also relates to an article comprising the water-absorbing resin.

Advantageous Effects of Invention

The water-absorbing resin of the present invention is excellent in water absorption performance. In addition, the water-absorbing resin of the present invention is easily degraded and can therefore reduce the environmental burden at the time of disposal.

DESCRIPTION OF EMBODIMENTS

<<Water-Absorbing Resin>>

Figure 1:
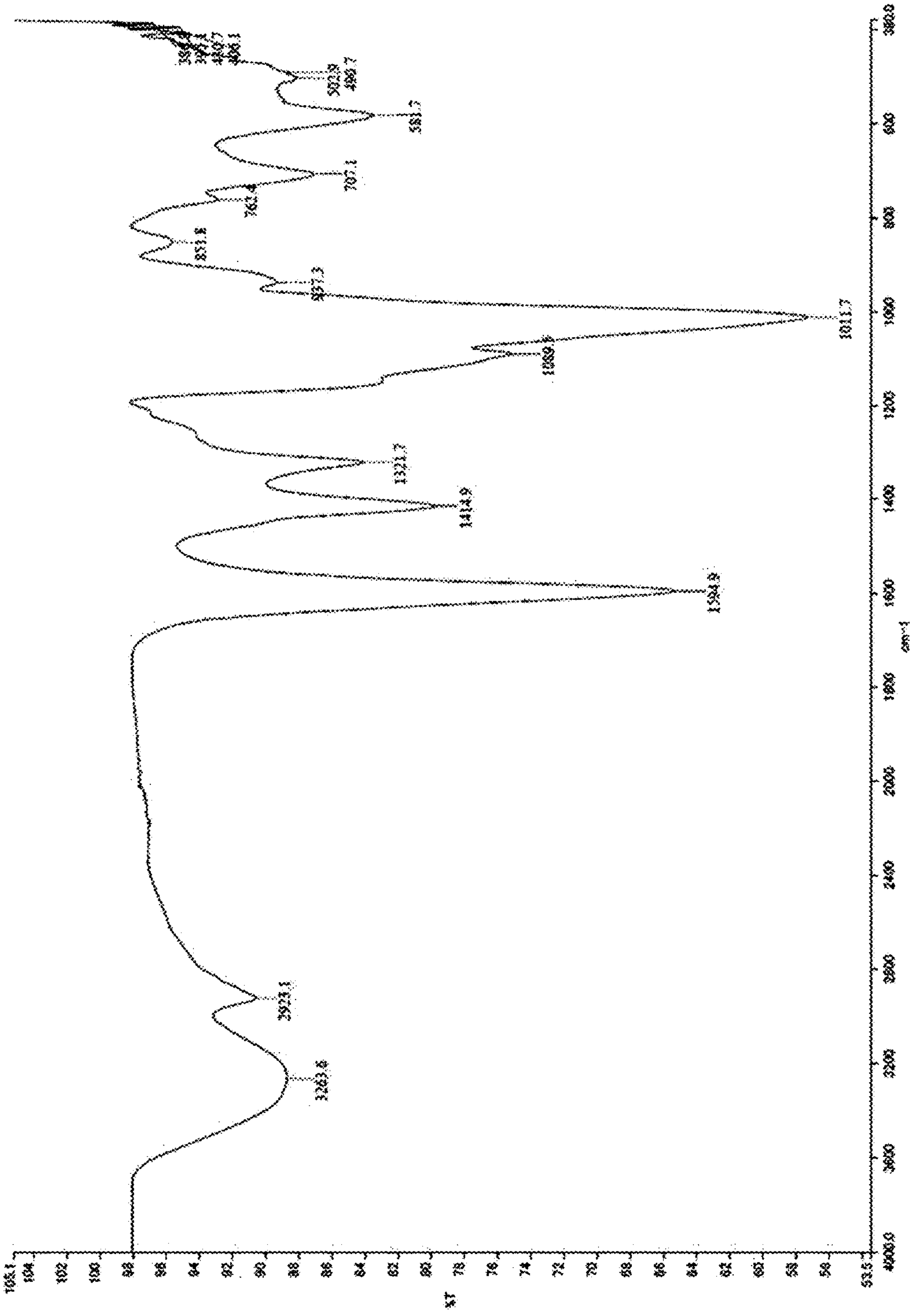
FIG. 1 shows the FT-IR spectrum of the glucose polymer of Production Example 15.

The water-absorbing resin of the present invention is a crosslinked product of a glucose polymer which is a starch or a partially degraded starch, with an acidic group introduced therein, characterized by forming a physical gel upon water absorption.

<Starch or Partially Degraded Starch>

The present invention uses a starch or a partially degraded starch as a main material of the water-absorbing resin. The use of starch makes it possible to obtain a water-absorbing resin that is highly safe to the human body, is excellent in absorbency and is low in environmental burden at the time of disposal. Examples of the starch as a raw material include, but are not limited to, tapioca starch, potato starch, corn starch such as waxy corn starch and high amylose starch, wheat starch, rice starch, and sweet potato starch. The term "partially degraded starch" refers to a product obtained by partially cleaving glucoside bonds of starch, that is, a polymer in which a large number of α-glucose molecules are linked via the glucoside bonds, without limitation to the position and mode of cleavage. A method for producing the water-absorbing resin will be described later, but a starch and a partially degraded starch may be used in combination when producing the water-absorbing resin.

When using a partially degraded starch, the weight average molecular weight of the partially degraded starch is preferably 7,500,000 or less, more preferably 5,000,000 or less, even more preferably 4,500,000 or less, further more preferably 4,000,000 or less, without limitation. The lower limit of the weight average molecular weight of the partially degraded starch is preferably 50,000 or more, more preferably 100,000 or more, even more preferably 200,000 or more, without limitation. If the weight average molecular weight is less than 50,000, the water absorption amount of the water-absorbing resin tends to decrease. When the viscosity of starch affects the operability in production, two or more starches and/or degradation products of starch each having different weight average molecular weight, or in addition, other additives or the like, can be used in combination, depending on its application or cost. The method for measuring the weight average molecular weight is not limited, but the weight average molecular weight can be determined, for example, by aqueous size exclusion chromatography analysis, based on a calibration curve for the molecular weight vs. the elution time prepared with pullulan having a known molecular weight.

The dispersity (weight average molecular weight/number average molecular weight) of the partially degraded starch is generally 5 or more without limitation. If the dispersity is less than 5, the water absorption amount of the water-absorbing resin tends to decrease. The upper limit of the dispersity is not limited. The method for measuring the number average molecular weight is not limited, but the number average molecular weight can be determined, for example, by aqueous size exclusion chromatography analysis, based on a calibration curve for the molecular weight vs. the elution time prepared with pullulan having a known molecular weight.

The weight average molecular weight and dispersity of the starch or the partially degraded starch are as described above. When the starch is used alone, it is preferably a starch derived from waxy corn, tapioca, corn or potato, more preferably a starch derived from waxy corn, tapioca or corn. When the partially degraded starch is used alone, the weight average molecular weight is preferably 50,000 to 7,500,000, more preferably 50,000 to 5,000,000, even more preferably 100,000 to 4,000,000. The dispersity is preferably 5 or more, more preferably 7 or more.

<Glucose Polymer, Acidic Group>

As used herein, the term “glucose polymer” refers to a polymer having an acidic group introduced into a starch or a partially degraded starch.

Examples of the acidic group include an acidic group having a carboxyl group such as a carboxyalkyl group or a carboxyalkenyl group; an acidic group having a sulfo group such as a sulfoalkyl group or a sulfoalkenyl group; and an acidic group having a phospho group such as phosphoalkyl groups or phosphoalkenyl group.

The carboxyalkyl group is an alkyl group substituted with a carboxyl group. The alkyl group to be substituted with a carboxyl group preferably has carbon atoms of 1 to 8, more preferably 1 to 5. The alkyl group may be either linear or branched. Specific examples of the alkyl group include a methyl group, an ethyl group, an n-propyl group, an i-propyl group, an n-butyl group, an i-butyl group, an s-butyl group, a t-butyl group, an n-pentyl group, a 1-methyl-n-butyl group, a 2-methyl-n-butyl group, a 3-methyl-n-butyl group, a 1,1-dimethyl-n-propyl group, a 1,2-dimethyl-n-propyl group, a 2,2-dimethyl-n-propyl group and a 1-ethyl-n-propyl group or the like.

Specific examples of the carboxyalkyl group include a carboxymethyl group, carboxyethyl group, a carboxypropyl group, a carboxybutyl group and a carboxypentyl group or the like.

The carboxyalkenyl group is an alkenyl group substituted with a carboxyl group. The alkenyl group to be substituted with a carboxyl group preferably has carbon atoms of 2 to 8, more preferably 2 to 4. The alkenyl group may be either linear or branched. Specific examples of the alkenyl group include an ethenyl group, a 1-propenyl group, a 2-propenyl group, a 1-methyl-1-ethenyl group, a 1-butenyl group, a 2-butenyl group, a 3-butenyl group, a 2-methyl-1-propenyl group, a 2-methyl-2-propenyl group, a 1-ethylethenyl group, 1-methyl-1-propenyl group and a 1-methyl-2-propenyl group or the like.

Specific examples of the carboxyalkenyl group include a carboxyethenyl group, a carboxypropenyl group and a carboxybutenyl group or the like.

The sulfoalkyl group is an alkyl group substituted with a sulfo group. Examples of the alkyl group to be substituted with a sulfo group include the alkyl groups listed for the carboxyalkyl group. Specific examples of the sulfoalkyl group include a sulfomethyl group, a sulfoethyl group, and a sulfopropyl group.

The sulfoalkenyl group is an alkenyl group substituted with a sulfo group. Examples of the alkenyl group to be substituted with a sulfo group include the alkenyl groups listed for the carboxyalkenyl group. Specific examples of the sulfoalkenyl group include a sulfoethenyl group and a sulfopropenyl group.

The phosphoalkyl group is an alkyl group substituted with a phospho group. Examples of the alkyl group to be substituted with a phospho group include the alkyl groups listed for the carboxyalkyl group. Specific examples of the phosphoalkyl group include a phosphomethyl group, a phosphoethyl group and a phosphopropyl group.

The phosphoalkenyl group is an alkenyl group substituted with a phospho group. Examples of the alkenyl group to be substituted with a phospho group include the alkenyl groups listed for the carboxyalkenyl group. Specific examples of the phosphoalkenyl group include a phosphoethenyl group and a phosphopropenyl group.

The acidic group is preferably an acidic group having a carboxyl group or a sulfo group, more preferably a carboxyalkyl group, a carboxyalkenyl group or a sulfoalkyl group, even more preferably a carboxyalkyl group having 1 to 5 carbon atoms, from the viewpoint of ease of introduction into the partially degraded starch.

The molecular weight of the glucose polymer is not limited, but the glucose polymer preferably has a weight average molecular weight of 500,000 to 50,000,000, more preferably 800,000 to 48,000,000 as determined by aqueous size exclusion chromatography using pullulan standards. If the weight average molecular weight is less than 500,000, the water absorption performance of the water-absorbing resin tends to be reduced, whereas if it is more than 50,000,000, the viscosity tends to be high and therefore tends to decrease in handleability in production. The weight average molecular weight as determined by aqueous size exclusion chromatography using pullulan standards can be determined based on a calibration curve for the molecular weight vs. the elution time prepared with pullulan having a known molecular weight.

The total acid value of the glucose polymer is preferably 50 to 350 mg KOH/g, more preferably 70 to 300 mg KOH/g. As will be described later, some of the salts of acidic groups added to starch or partial degradation products of starch are neutralized during the production of the water-absorbing resin, but the total acid value means the acid value measured by returning the neutralized acidic group to a unneutralized state, which represents the amount of all the acidic groups that the glucose polymer has. If the total acid value is less than 50 mg KOH/g or more than 350 mg KOH/g, the water-absorbing resin after crosslinking the glucose polymer tends to decrease in water absorption performance for an aqueous solution containing an electrolyte such as physiological saline.

When the acidic groups have been introduced by reacting a haloalkyl group having the acidic group with the hydroxyl group of a starch, to provide a glucose polymer, the amount of the acidic groups that have been introduced can also be represented by the degree of etherification. The degree of etherification is preferably 0.1 to 2.0, more preferably 0.2 to 1.5. The degree of etherification can be determined, for example, by an ashing-titration method. The total acid value is detected by the introduction of acidic groups. Therefore, when the starch or the partially degraded starch to be used as a raw material contain no acidic group, the acidic groups detected by the measurement of the total acid value is believed to be equivalent to those introduced by an etherification reaction. Therefore, when the starch or the partially degraded starch to be used as a raw material has no acidic group, the degree of etherification may be calculated conveniently from the above total acid value. For example, when the acidic group is a carboxymethyl group and each carboxymethyl group is neutralized into a sodium salt, the degree of etherification can be calculated as follows:

$$\text{Degree of etherification}=(162\times\text{total acid value})\div(56{,}100-80\times\text{total acid value}).$$

The total acid value in this case is expressed in unit of mg KOH/g.

The free acid value of the glucose polymer is preferably 5 to 50 mg KOH/g, more preferably 7 to 25 mg KOH/g. The term "free acid value" means the acid value measured for the unneutralized acidic group. If the free acid value is less than 5 mg KOH/g or more than 50 mg KOH/g, the water absorption performance of the water-absorbing resin tends to be reduced.

The dispersity (weight average molecular weight/number average molecular weight) of the glucose polymer is preferably 5 to 110, more preferably 7 to 70, without limitation. If the dispersity is less than 5 or more than 110, the water absorption performance of the water-absorbing resin tends to be reduced. The number average molecular weight of the glucose polymer was determined by aqueous size exclusion chromatography analysis, based on a calibration curve for the molecular weight vs. the elution time prepared with pullulan having a known molecular weight.

<Crosslinked Structure of Water-Absorbing Resin>

Water-absorbing resins having a polyacrylic acid as a main constitutional unit generally have a network structure formed by covalent bonds, and forms a chemical gel upon absorption of water. In contrast, the water-absorbing resin of the present invention is characterized in that it forms a physical gel upon absorption of water. The physical gel can relatively easily lose the crosslinking point, for example, due to thermal motion of molecular chains or changes in pH or ionic strength, to be converted into a flowable sol. Therefore, the physical gel is easily degraded, for example, by addition of alkali or acid, heating or shaking, leading to reduction in environmental load at the time of disposal.

The formation of the physical gel is confirmed by confirmation of the sol-gel transition due to the disappearance of the crosslinking point. For example, crosslinking by ionic and/or hydrogen bonding is confirmed by fluidization behavior after alkali or acid treatment. Specifically, when the water-absorbing resin is suspended in an aqueous solution of 1% sodium hydroxide so that the final concentration of the water-absorbing resin is 5% by weight, and stirred for 60 minutes, followed by sieving it through a sieve having an opening of 500 μm, it can be judged that if the dry weight of the water-absorbing resin remaining on the sieve is less than 2% by weight of the dry weight of the water-absorbing resin contained in the aqueous solution, the physical gel is formed upon absorption of water.

More specifically, 0.5 g of the water-absorbing resin is suspended in 9.5 g of a 18 aqueous NaOH solution and stirred for 60 minutes followed by natural filtration through a 30-mesh wire mesh of about 50 mm×50 mm square (opening: 500 μm) and washing the top of the wire mesh with ion-exchanged water. After washing, the wire mesh is dried with a blower dryer at 120° C. for 2 hours. When the 30-mesh pass residue determined by the following equation is less than 2% by weight, it can be judged that a physical gel is formed upon absorption of water:

$$\text{30-Mesh pass residue }(\%)=(Wm2-Wm1)/0.5\times100$$

wherein Wm1 represents the weight of the wire mesh before filtration; and Wm2 represents the weight of the wire mesh after filtration and drying. The sieve having an opening of 500 μm is a 30-mesh sieve specified by JIS. The 30-mesh pass residue is preferably less than 2% by weight, more preferably less than 1.5% by weight, even more preferably less than 1.0% by weight, further more preferably less than 0.5% by weight.

The water-absorbing resin is a crosslinked product of the glucose polymer described above. The crosslinking includes internal crosslinking and optionally surface crosslinking. However, the water-absorbing resin preferably has no internal crosslinked structure via an ether bond or ester bond. The water-absorbing resin also preferably has no internal crosslinked structure via a covalent bond. Examples of the covalent bond include an ester bond, an ether bond, a carbon-carbon covalent bond and a carbon-carbon double bond, or the like. Examples of the internal crosslinked structure constituting the water-absorbing resin include an ionic bond between an acidic group and a neutralized acidic group on the glucose polymer; an ionic bond with a compound having an charge opposite to that of the glucose polymer (when the acidic group of the glucose polymer is a carboxylic acid, a compound containing a basic group such as a cationic group or an amino group); an ionic bond with a divalent alkali metal ion; a coordination bond via a metal ion; and a hydrogen bond such as that in dimerization of a carboxylic acid when the ionic functional group is a carboxylic acid group. A method for forming a surface crosslink will be described later.

The water-absorbing resin may optionally contain a constitutional unit other than the glucose polymer described above. Examples of the constitutional unit other than the glucose polymer include a compound having a charge opposite to that of the glucose polymer, for example, a polymer having an amino group or a salt thereof such as chitosan, polyethyleneimine or vinylpyrrolidone-N,N-dimethylaminoethyl methacrylic acid copolymer; and a polymer having a quaternary ammonium group such as dimethylamine-epichlorohydrin copolymer or polydiallyldimethylammonium chloride. When the water-absorbing resin contains the constitutional unit other than the glucose polymer, the content thereof is preferably 90% by weight or less, more preferably 50% by weight or less, relative to the total amount of the glucose polymer used as the main component.

The water-absorbing resin may contain water and/or a hydrophilic solvent. Examples of the hydrophilic solvent include methanol, ethanol, n-propanol, isopropanol, acetone, ethylene glycol, propylene glycol, diethylene glycol, ethylene glycol monoethyl ether, ethylene glycol monobutyl ether, diethylene glycol dimethyl ether and dimethylsulfoxide or the like. The content of water and/or hydrophilic solvent in the water-absorbing resin is preferably 0.1 to 20%, more preferably 1 to 19%. If the content is less than 0.1%, the water absorption speed tends to decrease, whereas if it is more than 20%, particles of the water-absorbing resin tend to easily aggregate upon absorption of water. The content of water and/or hydrophilic solvent can be adjusted by subjecting the water-absorbing resin to a treatment such as heating or drying.

<Physical Properties of Water-Absorbing Resin>

The water absorption rate under no pressure of the water-absorbing resin is determined by measuring the absorbency of the water-absorbing resin for of physiological saline or ion-exchanged water when no load is applied to the water-absorbing resin by the method described in the following Example. The water-absorbing resin of the present invention, in a solid state, preferably has a water absorption rate under no pressure for ion-exchanged water of 100 to 400 g/g, more preferably 120 to 350 g/g. The water-absorbing resin of the present invention preferably has a water absorption rate under no pressure for physiological saline of 20 to 70 g/g, more preferably 30 to 65 g/g.

The water-absorbing resin preferably has a ratio (A/B) of the water absorption rate under no pressure for ion-exchanged water (A) to the water absorption rate under no pressure for physiological saline (B) of 7 or less, more preferably 5 or less.

The water retention rate of the water-absorbing resin is determined by measuring the absorbency of the water-absorbing resin for physiological saline or ion-exchanged water when a load of 150 G is applied to the water-absorbing resin by the method described in the following Example. The water-absorbing resin of the present invention, in a solid state, preferably has a water retention rate for ion-exchanged water of 80 to 300 g/g, more preferably 100 to 250 g/g. The water-absorbing resin of the present invention preferably has a water retention rate for physiological saline of 7 to 60 g/g, more preferably 10 to 60 g/g, even more preferably 20 to 60 g/g.

<Process for Producing Water-Absorbing Resin>

The method for the water-absorbing resin of the present invention is not limited as long as the water-absorbing resin has the structure described above, but for example, the water-absorbing resin can be obtained by: a step of introducing an acidic group into a starch optionally after partially degrading the starch; and a step of forming an internal crosslinked structure. When partially degrading a starch, the step of partially degrading the starch and the step of introducing an acidic group into the starch may be performed in any order, that is, either step may be performed first.

In the step of partially degrading a starch, an α-1,4-glucoside bond of an α-glucose molecule constituting the starch is often cleaved, without limitation to the position and manner of degradation. The method for degrading a starch is not limited and is any method including enzymatic treatment, acid treatment, physical crushing or the like. These methods may be used in combination. The enzyme treatment may be performed after or at the same time as gelatinization of a starch. Examples of the method for performing enzymatic treatment after gelatinization of a starch include a method including: first suspending a starch in water and heating it to gelatinize it; and then adding an enzyme thereto leading to an enzymatic reaction. Examples of the method for performing enzymatic treatment at the same time as gelatinization of a starch include a method including: suspending a starch in water and adding an enzyme thereto to provide a mixed liquid; and then heating the mixed liquid at such a temperature range as does not completely inactivate the enzyme. Among these methods, preferred is a method in which the starch is degraded while heating and kneading a starch at 70° C. to 110° C. to gelatinize it.

When the starch is partially degraded by enzymatic treatment, the enzyme to be used is not limited as long as it can degrade the starch, and may be either an exo-type enzyme or an endo-type enzyme. Specific examples of the enzyme include α-amylase, cyclomaltodextrin glucanotransferase, 4-α-glucanotransferase, 4,6-α-glucanotransferase, amylomaltase, neopullulanase and amylopullulanase, or the like. These enzymes may be used in combination. The pH during enzymatic treatment is preferably 5.0 to 7.0 without limitation. The pH can be adjusted by adding hydrochloric acid, acetic acid, sodium hydroxide, potassium hydroxide, or the like.

When a starch is partially degraded by acid treatment, the acid to be used is not limited as long as it can degrade the starch. Specific examples thereof include hydrochloric acid, sulfuric acid, oxalic acid, acetic acid, formic acid and trifluoroacetic acid. The temperature during acid treatment is preferably 150° C. to 160° C.

When a starch is partially degraded by physical crushing, specific examples therefor include, but are not limited, irradiation, shearing, milling, high-pressure treatment, ultrasonication, thermal degradation, photolytic degradation, and a combination thereof.

In the step of introducing an acidic group, a starch or a partially degraded starch is reacted with an acidic group-containing compound or a precursor thereof. This reaction introduces the acidic group into a hydroxyl group of the starch or the partially degraded starch. The acidic group-containing compound is not limited as long as it can introduce the acidic group. Examples thereof include a haloalkyl compound having an acidic group, a haloalkenyl compound having an acidic group, an acid anhydride, and salts thereof. Examples of the halogen constituting a haloalkyl compound and a haloalkenyl compound include chlorine and bromine.

Specific examples of the acidic group-containing compound include monochloroacetic acid, monobromoacetic acid, 3-bromopropionic acid, 6-bromohexanoic acid, succinic anhydride, maleic anhydride, vinylsulfonic acid, phosphorus oxychloride, ethyl monochloroacetate, and a sodium salt and a potassium salt thereof. Specific examples of the salt include sodium monochloroacetate, potassium monochloroacetate and sodium vinylsulfonate.

The precursor of the acidic group-containing compound includes acrylonitrile or the like. Examples of the method using acrylonitrile include a method including: first reacting acrylonitrile with a starch or a partial degradation product thereof under a basic condition to introduce a cyanoethyl group; converting the cyanoethyl group to an amide group (Synthesis; 1989 (12): 949-950): and then subjecting the resulting amide to alkaline hydrolysis.

The reaction of the starch or the partially degraded starch with monochloroacetic acid to produce a glucose polymer is summarized in formula (I).

(I)

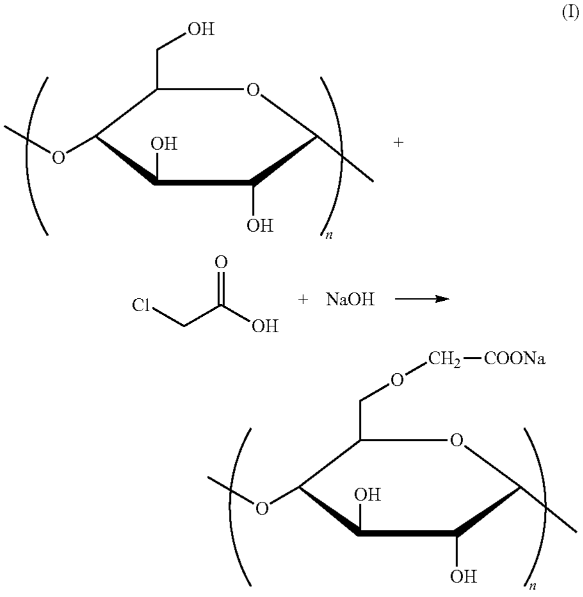

The reaction of the starch or the partially degraded starch with 3-bromopropionic acid to produce a glucose polymer is summarized in formula (II).

(II)

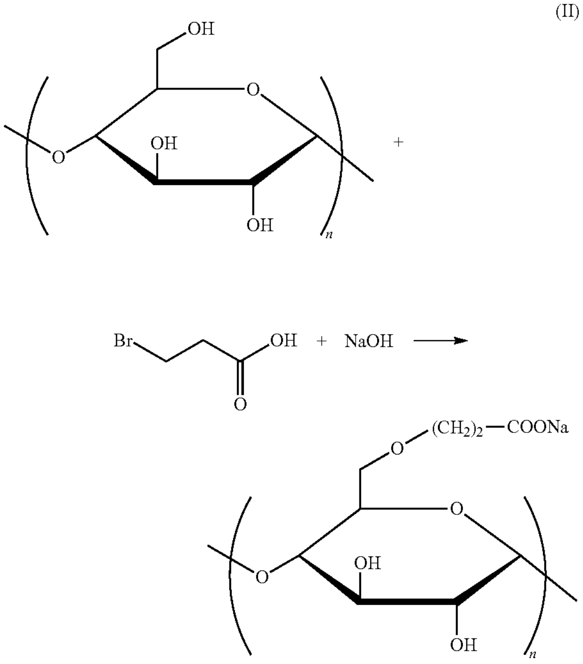

The reaction of the starch or the partially degraded starch with 6-bromohexanoic acid to produce a glucose polymer is summarized in formula (III).

(III)

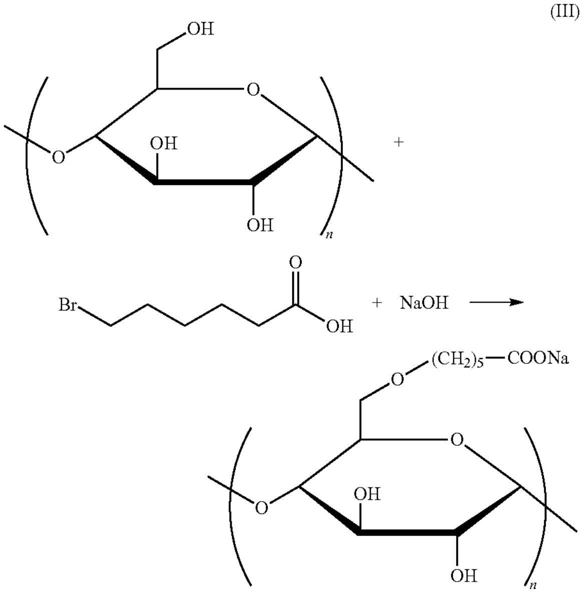

The reaction of the starch or the partially degraded starch with succinic anhydride to produce a glucose polymer is summarized in formula (IV).

(IV)

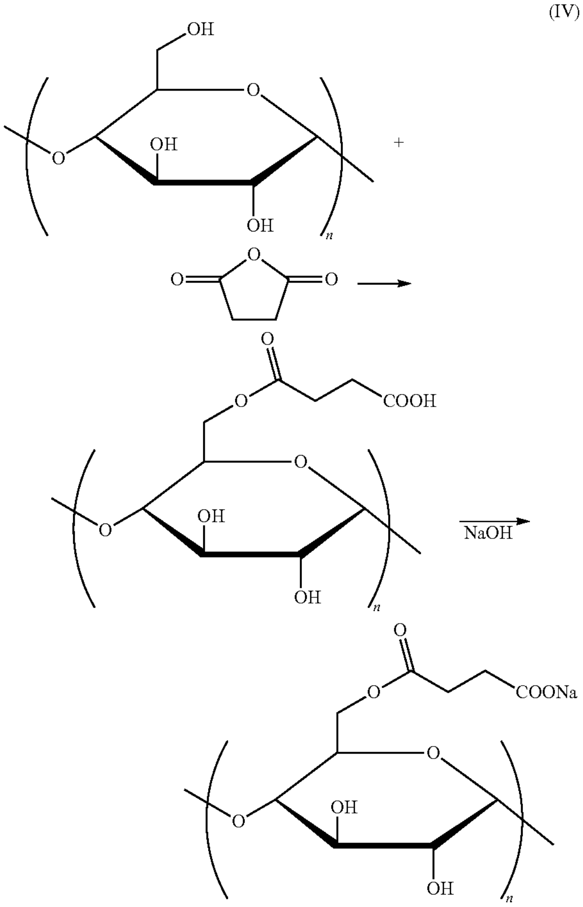

The reaction of the starch or the partially degraded starch with maleic anhydride to produce a glucose polymer is summarized in formula (V).

(V)

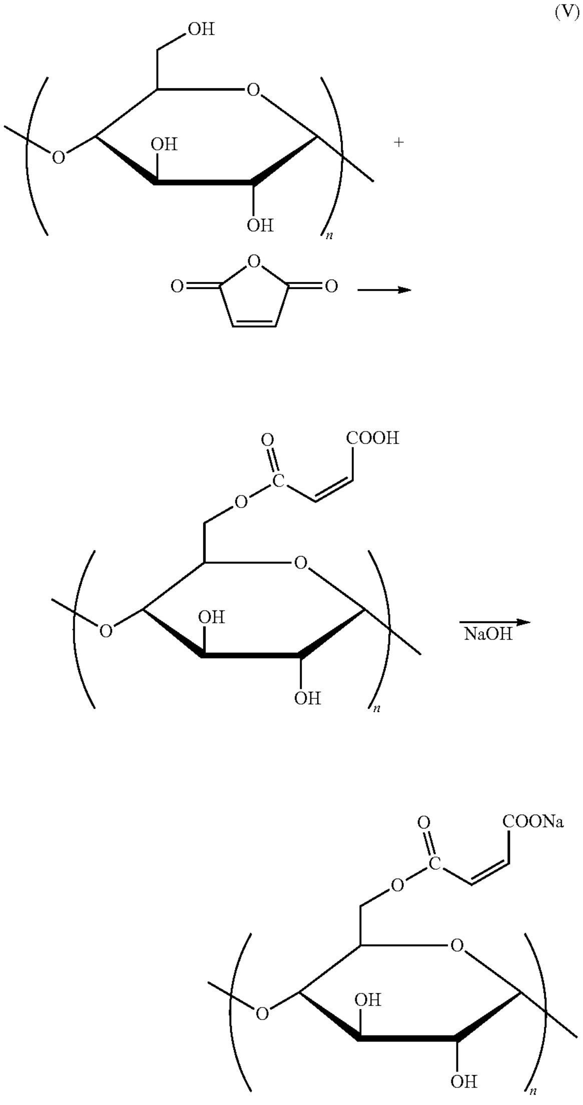

The reaction of the starch or the partially degraded starch with sodium vinylsulfonate to produce a glucose polymer is summarized in formula (VI).

(VI)

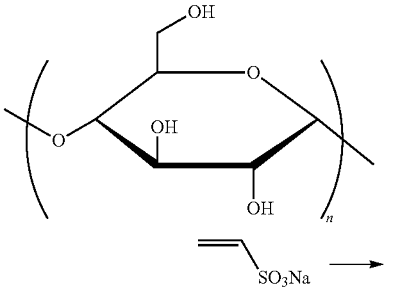

-continued

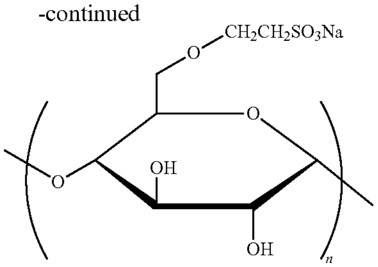

Each of the glucose polymers shown in the formulas (I) to (VI) has a sodium salt of an acidic group introduced into all hydroxyl groups at the 6-position of glucose units, but a hydroxyl group with no acidic group introduced thereinto may remain. An acidic group that has not been neutralized by a salt may also be present. The acidic group can be introduced into a hydroxyl group at any position as long as the hydroxyl group presents in the starch or the partially degraded starch, and the hydroxyl group may be the hydroxyl group at any of the 1-, 2-, 3-, 4- or 6-position.

When a haloalkyl compound or a haloalkenyl compound is used as the acidic group-containing compound, 1 to 1.5 equivalents of an alkaline agent is preferably used relative to the haloalkyl compound or haloalkenyl compound. Examples of the alkaline agent include sodium hydroxide, potassium hydroxide, lithium hydroxide, ammonia, sodium carbonate and potassium carbonate. The acidic group that has been introduced into the starch or the partially degraded starch preferably forms a salt with sodium, potassium, lithium, ammonia or the like derived from an alkaline agent. Therefore, the alkaline agent is preferably used in an amount required for both the reaction of a haloalkyl compound or a haloalkenyl compound with the starch or the partial degradation product thereof and the neutralization of the acidic group of the haloalkyl compound or the haloalkenyl compound. For example, when chloroacetic acid is used as the acidic group-containing compound, the alkaline agent is preferably used theoretically in an amount of 2 equivalents or more relative to chloroacetic acid. When sodium chloroacetate is used as the acidic group-containing compound, the alkaline agent is preferably used in an amount of 1 equivalent or more relative to sodium chloroacetate, since the acidic groups already has been neutralized.

The amount of the acidic group-containing compound to be used can be arbitrarily set depending on the desired total acid value (degree of etherification) of the glucose polymer. The amount is usually preferably 0.5 to 5.0 equivalents per mol of the hydroxyl groups in the starch or the partially degraded starch, more preferably 0.5 to 2.0 equivalents. When a haloalkyl compound such as chloroacetic acid as an aqueous solution is reacted with the starch or the partially degraded starch, the introduction reaction of the acidic group competes with the hydrolysis reaction of the haloalkyl compound, so that the haloalkyl compound is required in an amount more than the theoretical value. The amount of the haloalkyl compound to be used in the reaction as an aqueous solution is preferably set at 5 equivalents or less relative to the theoretical value.

The temperature during the reaction between the starch or the partially degraded starch and the acidic group-containing compound is preferably 0° C. to 120° C. without limitation. The reaction time is preferably 1 to 24 hours without limitation. The reaction may be performed in water, but it may be performed in a solvent mixture of water with an alcohol such as methanol, ethanol, isopropanol, butanol, ethylene glycol, diethylene glycol, propylene glycol, or a glycol ether such as ethylene glycol monoethyl ether, ethylene glycol dimethyl ether. The reaction may also be performed by dispersing the powder of the dried partially degraded starch in a hydrophilic solvent such as an alcohol such as methanol, ethanol, isopropanol or butanol or a glycol ether such as ethylene glycol dimethyl ether. When a solvent mixture is used, the proportion of the solvent other than water is preferably 50% by volume or less based on the solvent mixture. The reactor used may be a reaction vessel, an extruder, etc.

When a haloalkyl compound such as chloroacetic acid or a salt thereof is used as an acidic group-containing compound, the temperature during the reaction thereof with the starch or the partially degraded starch is not limited, but it is preferably 0° C. to 100° C.

In particular, when chloroacetic acid or a salt thereof is used as the haloalkyl compound, the reaction is preferably performed at 25° C. to 90° C. to prevent hydrolysis due to water in the reaction solution. The reaction time is preferably a period of time until the haloalkyl compound to be used as a raw material is consumed, more preferably 1 to 12 hours from the viewpoint of stability of the haloalkyl compound and process efficiency. The reaction may be performed in water, but it may be performed in a solvent mixture of water with an alcohol such as methanol, ethanol, isopropanol or butanol or a glycol ether such as ethylene glycol dimethyl ether. The reaction also may be performed by dispersing the powder of the dried partially degraded starch in a hydrophilic solvent such as an alcohol such as methanol, ethanol, isopropanol or butanol or a glycol ether such as ethylene glycol dimethyl ether. When a solvent mixture is used, the proportion of the solvent other than water is preferably 50% by volume or less based on the solvent mixture. The reactor used may be a reaction vessel, an extruder, etc.

When an acid anhydride is used as the acidic group-containing compound, the reaction proceeds only by mixing the partially degraded starch with the acid anhydride and heating the mixture. However, in order to promote the reaction, a catalyst may be used, for example, sodium carbonate, sodium hydroxide, a tertiary amine such as triethylamine, an imidazole such as 2-methylimidazole, a quaternary ammonium salt such as tetrabutylammonium bromide, or a phosphonium salt such as tetrabutylphosphonium bromide. The amount of such a catalyst to be added is preferably 0.1 equivalents or less relative to the acidic group-containing compound. These catalysts may be used alone or in combinations of two or more.

The reaction time is preferably a period of time until the acid anhydride to be used as a raw material is consumed, more preferably 1 to 12 hours. The end point of the reaction can be determined by measurement of the acid value or IR measurement. The reaction may be performed in water, but the reaction solvent is preferably an aprotic solvent such as dimethylsulfoxide, dimethylformamide, dimethylacetamide or N-methylpyrrolidone, in order to prevent hydrolysis or alcoholysis of the acid anhydride. When a solvent mixture is used, the proportion of the solvent other than water is preferably 50% by volume or more based on the solvent mixture. When the reaction is performed with no solvent, the reaction is preferably performed at a temperature equal to or more than the melting point of the acid anhydride because the acid anhydride can serve as a solvent. When the reaction is performed with a solvent, the reaction temperature is preferably 50° C. to 100° C., more preferably 70° C. to 90° C. The reactor used may be a reaction vessel, an extruder, etc.

Some of the salts of acidic groups added to starch or partial degradation products of starch are preferably neutralized. Neutralization converts some of the acidic groups that have formed salts into free acidic groups. For example, when monochloroacetic acid is used as the acidic group-containing compound described above and sodium hydroxide is used as the alkaline agent, a sodium salt of a carboxyl group is added to the starch or the partially degraded starch. By adding an acid thereto, some of the carboxyl groups are converted to free carboxylic acids.

The acid to be used for neutralization is not limited, but when the acidic group is a carboxyl group, the acid is preferably an acid having a pKa not more than that of the carboxyl group. Examples of such acids include hydrochloric acid, sulfuric acid, phosphoric acid, nitric acid, acetic acid, formic acid and trichloroacetic acid. A strong acid is preferably used for neutralization of the sulfo group or phospho group. Examples of the strong acid to be used include a mineral acid such as hydrochloric acid or sulfuric acid, and a strongly acidic ion exchange resin. The neutralization can be performed with any known equipment such as a reaction vessel or an extruder. After the addition of the acid, stirring is preferably performed at 0° C. to 50° C. for 0.2 to 1 hour for neutralization reaction. The neutralization reaction is preferably performed under the condition of pH 6.8 to 7.2.

In the step of introducing an acidic group or the subsequent neutralization reaction, a salt may be formed between the halogen derived from the acidic group-containing compound and the metal or ammonia derived from the alkaline agent, and desalting is therefore preferably performed. Examples of the method for desalting include a washing method by a process including: dropping, an aqueous solution obtained by dissolving a glucose polymer in water, into a hydrophilic solvent such as methanol, ethanol, isopropanol, acetone or acetonitrile; reprecipitating the glucose polymer; collecting it by filtration; then redispersing the glucose polymer collected by filtration in hydrous methanol (with a percent water content of about 70 to 90%); stirring it; thereafter collecting particles of the glucose polymer by filtration. Example of the method for desalting also include a method of treating an aqueous solution of a hydrophilic polymer with a filter having an ultrafiltration membrane. The washing liquid used for desalting can be water or a mixed liquid of water and a hydrophilic organic solvent such as methanol, ethanol, propanol, acetone or acetonitrile. Desalting is preferably performed until the salt concentration in the glucose polymer is 1% or less.

In the step of forming an internal crosslinked structure, one glucose polymer is crosslinked with another. The crosslinks can be formed with no crosslinking agent, for example, by a method of heat drying a glucose polymer, in which some of the acidic groups are in the form of free acidic groups, under water-containing conditions. The temperature during heat drying is preferably 50° C. to 150° C., more preferably 60° C. to 130° C. The air pressure during heat drying is not limited, and it can be performed at normal pressure, and specifically, it is preferably performed at 0.9 to 1.1 atm. The drying method is not limited, and drying can be performed with a drum dryer, a spray dryer, Nauta mixer or the like.

The glucose polymer may contain a hydrophilic solvent in addition to water during heat drying. Examples of the hydrophilic solvent include a lower aliphatic alcohol group such as methanol, ethanol, n-propanol or isopropanol; a ketone such as acetone; an ether such as dioxane, tetrahydrofuran or methoxy (poly)ethylene glycol; and an amide such as ε-caprolactam or N,N-dimethylformamide. The percentage of the hydrophilic solvent other than water in the total solvent is preferably adjusted depending on the boiling point of the solvent. When the boiling point of the solvent is 100° C. or less, the percentage is preferably 70% by volume or more, whereas when the boiling point of the solvent is more than 100° C., the percentage is preferably 30% by volume or less. The glucose polymer at the start of heat drying may be an aqueous solution or a powder containing an aqueous solvent having a water content of 1% by weight or more. When the powder containing the aqueous solvent is dried, the wetness percentage of the powder at the start of drying is preferably 1 to 85% by weight, more preferably 20 to 80% by weight, even more preferably 55 to 75% by weight. As used herein, the term "wetness percentage" refers to the percentage of the total amount of water and the hydrophilic solvent in the powder.

When producing the water-absorbing resin, surface crosslinking may be performed in addition to internal crosslinking. The surface crosslinking can improve the strength of the water-absorbing resin. Examples of the crosslinking agent to be used for surface crosslinking can include an epoxy compound, a polyhydric alcohol compound, a polyamine compound, a polyisocyanate compound, an alkylene carbonate compound, a haloepoxy compound, a halohydrin compound, a polyvalent oxazoline compound, a carbodiimide compound, a silane coupling agent and a polyvalent metal compound, or the like.

Examples of the epoxy compound include glycidyl ester succinate, sorbitol polyglycidyl ether, trimethylolpropane polyglycidyl ether, polyethylene glycol diglycidyl ether, glycerol polyglycidyl ether, diglycerol polyglycidyl ether, polyglycerol polyglycidyl ether, propylene glycol diglycidyl ether, polypropylene glycol diglycidyl ether and glycidol or the like.

Examples of the polyhydric alcohol compound can include ethylene glycol, diethylene glycol, propylene glycol, triethylene glycol, tetraethylene glycol, polyethylene glycol, 1,3-propanediol, dipropylene glycol, 2,2,4-trimethyl-1,3-pentanediol, polypropylene glycol, glycerin, polyglycerin, 2-butene-1,4-diol, 1,3-butanediol, 1,4-butanediol, 1,5-pentanediol, 1,6-hexanediol, 1,2-cyclohexanedimethanol, 1,2-cyclohexanediol, trimethylolpropane, diethanolamine, triethanolamine, polyoxypropylene, an oxyethylene-oxypropylene block copolymer, pentaerythritol and sorbitol or the like.

Examples of the polyamine compound can include ethylenediamine, diethylenetriamine, triethylenetetramine, tetraethylenepentamine, pentaethylenehexamine, polyethyleneimine, and an inorganic or organic salt of such a polyamine compound (such as an azitinium salt).

Examples of the polyisocyanate compound can include 2,4-tolylene diisocyanate and hexamethylene diisocyanate or the like, and examples of the polyvalent oxazoline compound can include 1,2-ethylenebisoxazoline or the like.

Examples of the alkylene carbonate compound can include 1,3-dioxolan-2-one, 4-methyl-1,3-dioxolan-2-one, 4,5-dimethyl-1,3-dioxolan-2-one, 4,4-dimethyl-1,3-dioxolane-2-one, 4-ethyl-1,3-dioxolan-2-one, 4-hydroxymethyl-1,3-dioxolan-2-one, 1,3-dioxan-2-one, 4-methyl-1,3-dioxan-2-one and 4,6-dimethyl-1,3-dioxan-2-one or the like.

Examples of the haloepoxy compound can include epichlorohydrin, epibromohydrin, α-methylepichlorohydrin and a polyamine adduct thereof (for example, Kymene® available from Hercules Incorporated) or the like.

Examples of the other known crosslinking agent that can be used include a waterborne carbodiimide compound (for example, CARBODILITE available from Nisshinbo Chemical Inc.); a silane coupling agent such as γ-glycidoxypropyltrimethoxysilane or γ-aminopropyltriethoxysilane; and a polyvalent metal compound such as a hydroxide or chloride of zinc, calcium, magnesium, aluminum, iron or zirconium or the like.

Among them, the crosslinking agent is preferably an epoxy compound, more preferably ethylene glycol diglycidyl ether, sorbitol polyglycidyl ether or glycidyl ester succinate.

Surface crosslinks can be formed by spraying a surface crosslinking agent to a water-absorbing resin; and mixing it by a known method with a cylindrical mixer, V-shaped mixer, ribbon mixer, screw mixer, twin-arm mixer, pulverizing kneader, or the like to crosslink it. A surfactant may be added as necessary during spraying and mixing.

The water-absorbing resin may also contain other additives such as a disinfectant, a deodorant, an antimicrobial agent, a fragrance, various inorganic powders, a foaming agent, a pigment, a dye, a hydrophilic short fiber, a fertilizer, an oxidizing agent, a reducing agent, water and a salt, for the purpose of imparting various functions. The amount of such an additive to be added is appropriately selected by those skilled in the art.

<Process for Degrading Water-Absorbing Resin>

The method for degrading a water-absorbing resin of the present invention is characterized by including a step of subjecting the water-absorbing resin to alkali treatment. In the step of subjecting the water-absorbing resin to alkali treatment, the water-absorbing resin is placed under the condition of preferably pH 9.0 or more, more preferably pH 10.0 or more. Alkali treatment can cleave the crosslinked structure and glucoside bonds of the water-absorbing resin to degrade it into glucose polymers to reduce the environmental burden at the time of disposal.

Examples of the alkaline agents to be used for the alkali treatment include, but are not limited to, sodium hydroxide, potassium hydroxide, lithium hydroxide, ammonia, sodium carbonate and potassium carbonate or the like. The alkali treatment can be performed at any temperature, for example, at 5° C. to 50° C.

<<Article Containing Water-Absorbing Resin>>

The article of the present invention includes the water-absorbing resin described above. Examples of the article include hygiene materials such as a paper diaper, a sanitary product, an incontinence pad, a portable toilet, a disposal bag, an animal waste disposal agent, a medical treatment material and a wound dressing; agricultural products such as a fertilizer; and civil engineering materials such as a soil modifier, a sludge solidifying agent and a water blocking material. Examples of the hygiene product include a laminate having a back sheet, an absorber and a top sheet laminated in this order. The absorber contains the water-absorbing resin of the present invention and may further contain a water-absorbing paper or pulp as necessary.

The article of the present invention may optionally contain a water-absorbing resin other than the crosslinked product of the glucose polymer of the present invention. Examples of the constitutional unit of such a water-absorbing resin include a polyacrylic acid (a salt thereof) such as a crosslinked product of a partially neutralized polyacrylic acid, a self-crosslinking product of a partially neutralized polyacrylic acid and a starch-acrylic acid graft polymer.

Examples of the salt of acrylic acid include a sodium salt, a potassium salt and an ammonium salt, or the like.

Other examples of the constitutional unit of the water-absorbing resin other than the crosslinked product of the glucose polymer of the present invention include an anionic unsaturated monomer such as methacrylic acid, maleic acid, vinylsulfonic acid, styrenesulfonic acid, 2-(meth)acrylamido-2-methylpropanesulfonic acid, 2-(meth)acryloylethanesulfonic acid or 2-(meth)acryloylpropanesulfonic acid, or a salt thereof; a nonionic unsaturated monomer containing a hydrophilic group such as acrylamide, methacrylamide, N-ethyl (meth)acrylamide, N-n-propyl (meth)acrylamide, N-isopropyl (meth)acrylamide, N,N-dimethyl (meth)acrylamide, 2-hydroxyethyl (meth)acrylate, 2-hydroxypropyl (meth)acrylate, methoxypolyethylene glycol (meth)acrylate, polyethylene glycol mono(meth)acrylate, vinylpyridine, N-vinylpyrrolidone, N-acryloylpiperidine or N-acryloylpyrrolidine; a cationic unsaturated monomer such as N,N-dimethylaminoethyl (meth)acrylate, N,N-diethylaminoethyl (meth)acrylate, N,N-dimethylaminopropyl (meth)acrylate, N,N-dimethylaminopropyl (meth)acrylamide, and a quaternary salt thereof; a linear cellulose and poly(γ-glutamic acid).

EXAMPLES

Hereinafter, the present invention will be described in detail with reference to Examples, but the present invention is not limited thereto. Hereinafter, the unit "part (s)" or "%" means "part (s) by weight" or "% by weight", respectively, unless otherwise specified.

(1) Materials Used (1-1) Raw Material for Starch
- Corns starch
- Tapioca
- Waxy corn
- Potato (1-2) Hydrolase
- α-amylase (Spitase® HK/R, available from Nagase ChemteX Corporation), 12,200 units/g
- Branching enzyme (Branchzyme® available from Novozymes A/S), 25,000 units/g Amylomaltase: *Thermus thermophilus* was aerobically cultured. The crushed extract of the collected bacterial cells was centrifuged, and the supernatant was used as a crude enzyme solution. The crude enzyme solution was subjected to column chromatography in a conventional manner, and the sample purified electrophoretically to a single product was used as a purified enzyme solution.

The activity of amylomaltase was determined in the following manner. A reaction liquid 1 containing 10% (w/v) maltotriose, a 50 mM sodium acetate buffer (pH 6.0), and the enzyme was incubated at 60° C. for 20 minutes. Thereafter, the reaction was stopped by heating at 100° C. for 10 minutes. The amount of glucose in the reaction liquid was measured by a glucose oxidase method. For the unit amount of amylomaltase, 1 unit was defined as the activity of amylomaltase that produces 1 μmol of glucose per minute.

(2) Production of Partially Degraded Starch (Production Examples 1 to 14 and Production Examples 54 to 56, and Production Example 63)

A partially degraded starch was produced in the following manner. The weight average molecular weight of the resulting partially degraded starch was determined by aqueous size exclusion chromatography analysis, based on a calibration curve for the molecular weight vs. the elution time prepared with pullulan having a known molecular weight.

Production Example 1: Partially Degraded Starch Derived from Corn Starch

Corn starch was suspended in a 20 mM acetate buffer (pH 6.0) until the concentration reached 15% by weight, to prepare a starch milk. To the starch milk were added 0.8 units of a crude enzyme solution of amylomaltase per gram of starch solids and 20 units of a branching enzyme per gram of starch solids. The mixture was stirred at room temperature for 30 minutes, and then kept at 80° C. for 6 hours while stirring for reaction to prepare a liquefied starch. The obtained partially degraded starch had a weight average molecular weight of 810,000.

Production Example 2: Partially Degraded Starch Derived from Corn Starch

Corn starch was suspended in a 20 mM acetate buffer (pH 6.0) until the concentration reached 15% by weight, to prepare a starch milk. To the starch milk were added 1.6 units of a crude enzyme solution of amylomaltase per gram of starch solids. The mixture was stirred at room temperature for 30 minutes, and then kept at 90° C. for 3 hours and then 80° C. for 17 hours while stirring for reaction to prepare a liquefied starch. The obtained partially degraded starch had a weight average molecular weight of 663,000.

Production Example 3: Partially Degraded Starch Derived from Corn Starch

Corn starch was suspended in a 20 mM acetate buffer (pH 6.0) until the concentration reached 15% by weight, to prepare a starch milk. To the starch milk were added 1.6 units of a purified enzyme solution of amylomaltase per gram of starch solids. The mixture was stirred at room temperature for 30 minutes, and then kept at 80° C. for 8 hours while stirring for reaction to prepare a liquefied starch. The obtained partially degraded starch had a weight average molecular weight of 720,000.

Production Example 4: Partially Degraded Starch Derived from Corn Starch

Corn starch was suspended in a 20 mM acetate buffer (pH 6.0) until the concentration reached 15% by weight, to prepare a starch milk. To the starch milk were added 0.6 units of a purified enzyme solution of amylomaltase per gram of starch solids and 0.03 units of α-amylase per gram of starch solids. The mixture was stirred at room temperature for 30 minutes, and then kept at 90° C. for 4.5 hours and then 100° C. for 1.5 hours while stirring for reaction to prepare a liquefied starch. The obtained partially degraded starch had a weight average molecular weight of 1,460,000.

Production Example 5: Partially Degraded Starch Derived from Tapioca Starch Tapioca starch was suspended in a 20 mM acetate buffer (pH 6.0) until the concentration reached 15% by weight, to prepare a starch milk. To the starch milk were added 1.6 units of a crude enzyme solution of amylomaltase per gram of starch solids. The mixture was stirred at room temperature for 30 minutes, and then kept at 80° C. for 20 hours while stirring for reaction to prepare a liquefied starch. The obtained partially degraded starch had a weight average molecular weight of 200,000.

Production Example 6: Partially Degraded Starch Derived from Tapioca Starch

Tapioca starch was suspended in a 20 mM acetate buffer (pH 6.0) until the concentration reached 15% by weight, to prepare a starch milk. To the starch milk were added 0.4 units of a crude enzyme solution of amylomaltase per gram of starch solids. The mixture was stirred at room temperature for 30 minutes, and then kept at 80° C. for 9 hours while stirring for reaction to prepare a liquefied starch. The obtained partially degraded starch had a weight average molecular weight of 1,180,000.

Production Example 7: Partially Degraded Starch Derived from Tapioca Starch

Tapioca starch was suspended in a 20 mM acetate buffer (pH 6.0) until the concentration reached 15% by weight, to prepare a starch milk. To the starch milk were added 0.4 units of a purified enzyme solution of amylomaltase per gram of starch solids. The mixture was stirred at room temperature for 30 minutes, and then kept at 80° C. for 3 hours while stirring for reaction to prepare a liquefied starch. The obtained partially degraded starch had a weight average molecular weight of 1,960,000.

Production Example 8: Partially Degraded Starch Derived from Waxy Corn Starch

Waxy corn starch was suspended in tap water, calcium chloride was added thereto until the final concentration reached 1 mM, and the pH was adjusted to 6.0 to prepare a starch milk with a concentration of about 15% by mass. To this starch milk were added 0.78 units of α-amylase per gram of starch solids. The mixture was stirred for 30 minutes, and thereafter was passed through a continuous liquefaction device at a flow rate of 1 L/min. The starch milk was heated in the continuous liquefaction device at 100° C. for 25 minutes, and then kept at 140° C. for 5 minutes to prepare a liquefied starch. The obtained partially degraded starch had a weight average molecular weight of 610,000.

Production Example 9: Partially Degraded Starch Derived from Waxy Corn Starch

The preparation was performed in the same manner as in Production Example 8, except that the amount of enzyme added was changed to 0.36 U. The obtained partially degraded starch had a weight average molecular weight of 1,330,000.

Production Example 10: Partially Degraded Starch Derived from Potato Starch

Potato starch was suspended in a 20 mM acetate buffer (pH 6.0) until the concentration reached 15% by weight, to prepare a starch milk. To the starch milk were added 0.8 units of a purified enzyme solution of amylomaltase per gram of starch solids. The mixture was stirred at room temperature for 30 minutes, and then kept at 80° C. for 4 hours while stirring for reaction to prepare a liquefied starch. The obtained partially degraded starch had a weight average molecular weight of 1,530,000.

Production Example 11: Partially Degraded Starch Derived from Corn Starch

Corn starch was suspended in a 20 mM acetate buffer (pH 6.0) until the concentration reached 15% by weight, to prepare a starch milk. To the starch milk were added 0.6 units of a purified enzyme solution of amylomaltase per gram of starch solids and 0.03 units of α-amylase per gram of starch solids. The mixture was stirred at room temperature for 30 minutes, and then kept at 90° C. for 4.5 hours and then 100° C. for 1.5 hours while stirring for reaction to prepare a liquefied starch. The obtained partially degraded starch had a weight average molecular weight of 1,460,000.

Production Example 12: Partially Degraded Starch Derived from Corn Starch

Corn starch was suspended in a 20 mM acetate buffer (pH 6.0) until the concentration reached 15% by weight, to prepare a starch milk. To the starch milk were added 0.6 units of a purified enzyme solution of amylomaltase per gram of starch solids and 0.03 units of α-amylase per gram of starch solids. The mixture was stirred at room temperature for 30 minutes, and then kept at 80° C. for 6 hours while stirring for reaction to prepare a liquefied starch. The obtained partially degraded starch had a weight average molecular weight of 1,040,000.

Production Example 13: Partially Degraded Starch Derived from Tapioca Starch

Tapioca starch was suspended in a 20 mM acetate buffer (pH 6.0) until the concentration reached 15% by weight, to prepare a starch milk. To the starch milk were added 1.6 units of a purified enzyme solution of amylomaltase per gram of starch solids. The mixture was stirred at room temperature for 30 minutes, and then kept at 80° C. for 20 hours while stirring for reaction to prepare a liquefied starch. The obtained partially degraded starch had a weight average molecular weight of 190,000.

Production Example 14: Partially Degraded Starch Derived from Corn Starch

Corn starch was suspended in a 20 mM acetate buffer (pH 6.0) until the concentration reached 15% by weight, to prepare a starch milk. To the starch milk were added 8.0 units of a purified enzyme solution of amylomaltase per gram of starch solids. The mixture was stirred at room temperature for 30 minutes, and then kept at 90° C. for 3.0 hours and then at 80° C. for 21 hours while stirring for reaction to prepare a liquefied starch. The obtained partially degraded starch had a weight average molecular weight of 270,000.

Production Example 54: Partially Degraded Starch Derived from Corn Starch

Corn starch was suspended in city water until the concentration reached 30% (w/w), and 1N sodium hydroxide was then added thereto to adjust the pH to 6.0 to obtain a starch milk. To the starch were added milk 0.2 units of a crude enzyme solution of amylomaltase per gram of starch solids. The mixture was stirred at room temperature for 30 minutes, and then allowed to react at 80° C. for 6 hours while stirring to prepare a liquefied starch. The obtained partially degraded starch had a weight average molecular weight of 6,070,000 and a dispersity of 35.4.

Production Example 55

Corn starch was suspended in city water until the concentration reached 30% (w/w), and 1N sodium hydroxide was then added thereto to adjust the pH to 6.0 to obtain a starch milk. To the starch milk were added 0.15 units of a crude enzyme solution of amylomaltase per gram of starch solids and 0.04 units of α-amylase per gram of starch solids. The mixture was stirred at room temperature for 30 minutes, and then allowed to react at 80° C. for 6 hours while stirring to prepare a liquefied starch. The obtained partially degraded starch had a weight average molecular weight of 1,340,000 and a dispersity of 10.6. The resulting aqueous solution of the partially degraded starch was dried in a vacuum at 80° C., and the resulting dried product was pulverized to collect a dry powder product of 1 mm pass. The moisture content of the dry powder product was 2.7%.

Production Example 56

Corn starch was suspended in city water until the concentration reached 15% (w/w), and 1N sodium hydroxide was then added thereto to adjust the pH to 6.0 to obtain a starch milk. To the starch milk were added 0.5 units of α-amylase per gram of starch solids. The mixture was stirred at room temperature for 30 minutes, and then allowed to react at 100° C. for 20 minutes while stirring to prepare a liquefied starch. The obtained partially degraded starch had a weight average molecular weight of 1,370,000 and a dispersity of 65.6.

Production Example 63

Corn starch was suspended in city water until the concentration reached 30% (w/w), and 1N sodium hydroxide was then added thereto to adjust the pH to 6.0 to obtain a starch milk. To the starch milk 0.2 units of a crude enzyme solution of amylomaltase per gram of starch solids were added. The mixture was stirred at room temperature for 30 minutes, and then allowed to react at 80° C. for 6 hours while stirring to prepare a liquefied starch. The obtained partially degraded starch had a weight average molecular weight of 1,910,000 and a dispersity of 10.1.

(3) Production of Glucose Polymer (Production Examples 15-31, Production Examples 58-59, and Production Example 64)

(3-1) Production Example 15

A 125 g portion of a 15% by weight aqueous solution of the partially degraded starch produced in Production Example 1 (0.35 mol of hydroxyl groups in the partially degraded starch) was charged into a 500 ml separable flask equipped with a stirrer, a thermometer, and a condenser tube. Next, 42.7 g of a 48.8% aqueous sodium hydroxide solution (0.52 mol, 1.5 equivalents relative to the hydroxyl group of the partially degraded starch) was charged into the flask, and stirred at a temperature of 60° C. or less until the solution was completely homogeneous. After confirming that the solution had been homogeneous, an aqueous solution prepared by dissolving 60.7 g of sodium monochloroacetate (0.52 mol, 1.5 equivalents relative to the hydroxyl group of the partially degraded starch) in 78.4 g of ion-exchanged water was charged dropwise at 50° C. to 60° C. over 30 minutes. After charging the aqueous sodium monochloroacetate solution, the temperature was adjusted to 80° C. to 85° C., and the mixture was stirred for 1 hour. The end point of the reaction was determined by sampling the reaction liquid and measuring the chloride ion content in the reaction liquid by potentiometric titration with a 0.01 N silver nitrate solution, provided that the chloride ion content had reached 98% or more of the calculated chloride ion content of 6.0% which corresponds to a chloride ion content when all sodium monochloroacetate has reacted. In this Production Example, the chlorine content was 6.2%.

After completion of the reaction, the reaction liquid was diluted with 28 g of ion-exchanged water. The diluted reaction liquid was cooled to room temperature and added to 1 L of methanol over about 30 minutes to reprecipitate a glucose polymer. After adding all the reaction liquid, the mixture was stirred for 30 minutes, and the glucose polymer dispersed in methanol was subjected to solid-liquid separation by filtration under reduced pressure.

Subsequently, in order to remove the sodium chloride contained in the glucose polymer, the collected glucose polymer was redispersed in 0.7 L of hydrous methanol with a methanol/water ratio of 80/20 (by volume), and then stirred and washed at room temperature for 30 minutes, followed by performing solid-liquid separation by filtration under reduced pressure to collect the glucose polymer again. The chlorine content of the collected glucose polymer was measured by potentiometric titration with a 0.01 N silver nitrate solution, and the washing process was repeated until the chlorine content was less than 1%. The resulting glucose polymer had a total acid value of 182 mg KOH/g and the degree of etherification as calculated from the total acid value was 0.71.

(3-2) Production Examples 16 to 28, Production Example 57

A glucose polymer was obtained by performing the reaction in the same manner as that in Production Example 15, except that the raw materials and the amounts thereof charged were changed as shown in Table 1.

TABLE 1

| | Glucose polymer | Production Example 15 | Production Example 16 | Production Example 17 | Production Example 18 | Production Example 19 | Production Example 20 |
|---|---|---|---|---|---|---|---|
| Starch | Type of starch | — | — | — | — | — | — |
| | Starch (g) | — | — | — | — | — | — |
| | Water for diluting starch (g) | — | — | — | — | — | — |

TABLE 1-continued

| | | Production Example 1 | Production Example 2 | Production Example 3 | Production Example 4 | Production Example 5 | Production Example 6 |
|---|---|---|---|---|---|---|---|
| | Partially hydrolyzed starch 1 | | | | | | |
| | Concentration of aqueous solution (%) | 15 | 15 | 15 | 15 | 15 | 15 |
| | Amount of aqueous solution (g) | 125.0 | 115.0 | 125.0 | 125.0 | 100.0 | 96.4 |
| | Partially hydrolyzed starch 2 | — | — | — | — | — | — |
| | Concentration of aqueous solution (%) | — | — | — | — | — | — |
| | Amount of aqueous solution (g) | — | — | — | — | — | — |
| Alkaline agent | 48.8% aqueous NaOH solution (g) | 42.7 | 27.5 | 42.7 | 42.7 | 23.9 | 32.9 |
| | 48% aqueous KOH solution (g) | — | — | — | — | — | — |
| Aqueous solution containing acidic group-containing compound | Sodium monochloroacetate (g) | 60.7 | 44.7 | 60.7 | 60.7 | 38.9 | 46.8 |
| | Monochloroacetic acid (g) | — | — | — | — | — | — |
| | Water for dissolving acidic group-containing compound (g) | 78.4 | 63.9 | 78.4 | 78.4 | 55.6 | 59.7 |
| Water for diluting reaction liquid (g) | | 28 | 0 | 150 | 150 | 0 | 25 |
| Methanol for reprecipitation (L) | | 1.0 | 0.8 | 1.5 | 1.5 | 0.7 | 0.8 |
| Aqueous methanol for washing (L) | | 0.7 | 0.6 | 0.7 | 1.3 | 0.5 | 0.5 |

| Glucose polymer | | Production Example 21 | Production Example 22 | Production Example 23 | Production Example 24 | Production Example 25 | Production Example 26 |
|---|---|---|---|---|---|---|---|
| Starch | Type of starch | — | — | — | — | — | — |
| | Starch (g) | — | — | — | — | — | — |
| | Water for diluting starch (g) | — | — | — | — | — | — |
| | Partially hydrolyzed starch 1 | Production Example 7 | Production Example 7 | Production Example 8 | Production Example 8 | Production Example 9 | Production Example 10 |
| | Concentration of aqueous solution (%) | 15 | 15 | 25 | 25 | 25 | 15 |
| | Amount of aqueous solution (g) | 125.0 | 114.8 | 82.5 | 95.2 | 93.7 | 115.0 |
| | Partially hydrolyzed starch 2 | — | Production Example 13 | — | — | — | — |
| | Concentration of aqueous solution (%) | — | 15 | — | — | — | — |
| | Amount of aqueous solution (g) | — | 12.8 | — | — | — | — |
| Alkaline agent | 48.8% aqueous NaOH solution (g) | 42.7 | 43.6 | 5.5 | 47.4 | 53.4 | 27.5 |
| | 48% aqueous KOH solution (g) | — | — | — | — | — | — |
| Aqueous solution containing acidic group-containing compound | Sodium monochloroacetate (g) | 60.7 | 61.9 | 8.9 | 77.0 | 75.8 | 44.7 |
| | Monochloroacetic acid (g) | — | — | — | — | — | — |
| | Water for dissolving acidic group-containing compound (g) | 78.4 | 79.9 | 10.4 | 150.0 | 150.0 | 63.9 |
| Water for diluting reaction liquid (g) | | 28 | 125 | 73 | 0 | 0 | 0 |
| Methanol for reprecipitation (L) | | 1.0 | 1.4 | 0.6 | 1.0 | 1.0 | 0.8 |
| Aqueous methanol for washing (L) | | 0.7 | 0.8 | 0.3 | 0.5 | 0.5 | 0.7 |

| Glucose polymer | | Production Example 27 | Production Example 28 | Production Example 29 | Production Example 30 | Production Example 31 | Production Example 57 |
|---|---|---|---|---|---|---|---|
| Starch | Type of starch | — | — | Waxy | Corn starch | Tapioca | — |
| | Starch (g) | — | — | 15 | 15 | 15 | — |
| | Water for diluting starch (g) | — | — | 75 | 75 | 75 | — |
| | Partially hydrolyzed starch 1 | Production Example 11 | Production Example 12 | — | — | — | Production Example 54 |
| | Concentration of aqueous solution (%) | 15 | 15 | — | — | — | 30 |
| | Amount of aqueous solution (g) | 112.5 | 77 | — | — | — | 66.3 |
| | Partially hydrolyzed starch 2 | Production Example 14 | — | — | — | — | — |
| | Concentration of aqueous solution (%) | 15 | — | — | — | — | — |
| | Amount of aqueous solution (g) | 12.5 | — | — | — | — | — |
| Alkaline agent | 48.8% aqueous NaOH solution (g) | 29.9 | — | 30.7 | 30.7 | 30.7 | 23.4 |
| | 48% aqueous KOH solution (g) | — | 75 | — | — | — | — |
| Aqueous solution containing acidic group-containing compound | Sodium monochloroacetate (g) | 48.5 | — | 43.7 | 43.7 | 43.7 | — |
| | Monochloroacetic acid (g) | — | 30.3 | 1 | — | — | 13 |
| | Water for dissolving acidic group-containing compound (g) | 69.4 | 40.4 | 71 | 71 | 71 | 3.3 |
| Water for diluting reaction liquid (g) | | 80 | 77 | 130 | 130 | 130 | 200 |
| Methanol for reprecipitation (L) | | 1.2 | 1.0 | 1.2 | 1.2 | 1.2 | 1.0 |
| Aqueous methanol for washing (L) | | 0.7 | 0.7 | 0.7 | 0.7 | 0.7 | 0.5 |

(3-3) Production Example 29

A 15 g portion of waxy corn starch (moisture content: 10% by weight) and 75 g of ion-exchanged water were charged into a 500 ml separable flask equipped with a stirrer, a thermometer and a condenser tube. Next, heating was performed while stirring and it was confirmed that the starch was gelatinized. Thereafter, 30.7 g of a 48.8% aqueous sodium hydroxide solution (0.38 mol, 1.5 equivalents relative to the hydroxyl group of the starch) was charged into the flask, and stirred at a temperature of 70° C. to 80° C. until the solution was completely homogeneous and clear. After confirming that the solution had been homogeneous and clear, an aqueous solution prepared by dissolving 43.7 g of sodium monochloroacetate (0.38 mol, 1.5 equivalents relative to the hydroxyl group of the starch) in 71.0 g of ion-exchanged water was charged dropwise at 70° C. to 80° C. over 30 minutes. After charging the aqueous sodium monochloroacetate solution, the temperature was adjusted to 80° C. to 85° C. and stirred for 1 hour. The end point of the reaction was determined by sampling the reaction liquid and measuring the chloride ion content in the reaction liquid by potentiometric titration with a 0.01 N silver nitrate solution, provided that the chloride ion contend had reached 98% or more of the calculated chloride ion content of 5.65% which corresponds to a chloride ion content when all sodium monochloroacetate has reacted. In this Production Example, the chlorine content was 5.64%.

After completion of the reaction, the reaction liquid was diluted with 130 g of ion-exchanged water. The diluted reaction liquid was cooled to room temperature and added to 1.2 L of methanol over about 30 minutes to reprecipitate a glucose polymer. After adding all the reaction liquid, the mixture was stirred for 30 minutes, and the glucose polymer dispersed in methanol was subjected to solid-liquid separation by filtration under reduced pressure.

Subsequently, in order to remove the sodium chloride contained in the glucose polymer, the collected glucose polymer was redispersed in 0.7 L of aqueous methanol with a water/methanol ratio of 20/80 (by volume), and was stirred and washed at room temperature for 30 minutes, followed by performing solid-liquid separation by filtration under reduced pressure to collect the glucose polymer again. The chlorine content of the collected glucose polymer was measured by potentiometric titration with a 0.01 N silver nitrate solution, and the washing process was repeated until the chlorine content was less than 1%. The resulting glucose polymer had a total acid value of 161 mg KOH/g and the degree of etherification as calculated from the total acid value was 0.61.

(3-4) Production Example 30

The glucose polymer was obtained by performing the same procedure as that in Production Example 29, except that the starch was changed to 15 g of corn starch (water content: 10% by weight). The resulting glucose polymer had a total acid value of 155 mg KOH/g and the degree of etherification as calculated from the total acid value was 0.57.

(3-5) Production Example 31

The glucose polymer was obtained by performing the same procedure as that in Production Example 29, except that the starch was changed to 15 g of tapioca starch (water content: 10% by weight). The resulting glucose polymer had a total acid value of 150 mg KOH/g and the degree of etherification as calculated from the total acid value was 0.55.

Production Example 58

A 20.0 g portion of the powder of the partially degraded starch produced in Production Example 55 (a hydroxyl group of the partially degraded starch: 0.36 mol) and 110 g of dimethyl sulfoxide (DMSO) were charged into a 300 ml separable flask equipped with a stirrer, a thermometer and a condenser tube to dissolve the powder. Next, 10.6 g of maleic anhydride (0.11 mol, 0.30 equivalents relative to the hydroxyl group of the partially degraded starch) was charged into the flask and stirred at 90° C. to 95° C. for 3 hours for reaction. After the stirring was completed, the reaction liquid was sampled and subjected to neutralization titration with 0.1N NaOH. The reaction liquid had an acid value of 70 mg KOH/g (theoretical acid value at the end point: 43 mg KOH/g).

After completion of the reaction, the reaction liquid was added to 2.5 L of acetone over about 30 minutes to reprecipitate a glucose polymer. After adding all the reaction liquid, the mixture was stirred for 30 minutes, and the glucose polymer dispersed in acetone was subjected to solid-liquid separation by filtration under reduced pressure, and collected.

Subsequently, in order to remove the unreacted maleic anhydride contained in the glucose polymer and the maleic acid generated by hydrolysis, the collected glucose polymer was redispersed in 500 mL of acetone, and was stirred and washed at room temperature for 30 minutes, followed by performing solid-liquid separation by filtration under reduced pressure to collect the glucose polymer again. The resulting glucose polymer had a total acid value of 90 mg KOH/g. The resulting glucose polymer had a weight average molecular weight of $3.1\times10^6$ and a dispersity of 39.6.

Production Example 59

A 27.2 g portion of the powder of the partially degraded starch produced in Production Example 56 (a hydroxyl group of the partially degraded starch: 0.47 mol) and 58.1 g of dimethyl sulfoxide (DMSO) were charged into a 300 ml separable flask equipped with a stirrer, a thermometer and a condenser tube to dissolve the powder. Next, 14.2 g of succinic anhydride (0.14 mol, 0.30 equivalents relative to the hydroxyl group of the partially degraded starch) was charged into the flask and stirred at 70° C. to 75° C. for 1 hours for reaction. After the stirring was completed, the reaction liquid was sampled and subjected to neutralization titration with 0.1N NaOH. The reaction liquid had an acid value of 85 mg KOH/g (theoretical acid value at the end point: 80.1 mg KOH/g at the end point).

After completion of the reaction, the reaction solution was diluted by adding 125 g of ion-exchanged water thereto. A 10.8 g portion (0.13 mol) of a 48% aqueous NaOH solution was further added thereto to neutralize 93% of the theoretical amount of the carboxylic acid introduced by the reaction with succinic anhydride to form a sodium salt. Subsequently, the resulting solution was added to 750 ml of methanol over about 30 minutes to reprecipitate a glucose polymer. After adding all the reaction liquid, the mixture was stirred for 30 minutes, and the glucose polymer dispersed in methanol was subjected to solid-liquid separation by filtration under reduced pressure and collected.

Subsequently, in order to remove the unreacted succinic anhydride contained in the glucose polymer and the succinic acid generated by hydrolysis, the collected glucose polymer was redispersed in 500 mL of methanol, and was stirred and washed at room temperature for 30 minutes, followed by performing solid-liquid separation by filtration under reduced pressure to collect the glucose polymer again. The total acid value and free acid value of the resulting glucose polymer was measured. It was confirmed that the polymer had a total acid value of 138 mg KOH/g and a free acid value of 37 mg KOH/g and had been partially neutralized. The resulting glucose polymer had a weight average molecular weight of $3.7\times10^6$ and a dispersity of 13.8.

TABLE 2

| Water-soluble polymer | | Production Example 58 | Production Example 59 |
|---|---|---|---|
| Partially hydrolyzed of starch 1 | | Production Example 55 | Production Example 56 |
| | Weight of powder (g) | 20 | 27.2 |
| DMSO (g) | | 110 | 58.1 |
| Acid anhydride (g) | Succinic anhydride | — | 14.2 |
| | Maleic anhydride | 10.6 | — |
| Reaction temperature (° C.) | | 90~95 | 70~75 |
| Water for diluting reaction liquid (g) | | — | 125 |
| 48% aqueous NaOH solution(g) | | — | 10.8 |
| Solvent for reprecipitation (L) | Methanol | — | 0.75 |
| | Acetone | 2.5 | — |
| Solvent for washing (L) | Methanol | — | 0.5 |
| | Acetone | 0.5 | — |
| Physical properties of water-soluble polymer | $Mw(\times10^6)$ | 3.1 | 3.7 |
| | Mw/Mn | 39.6 | 13.8 |
| | Total acid value (mgKOH/g) | 90 | 138 |
| | Free acid value (mgKOH/g) | — | 37 |

Production Example 64

A 200 g portion of a 30% by weight aqueous solution of the partially degraded starch produced in Production Example 63 (a hydroxyl group of the partially degraded starch: 1.11 mol) was charged into a 500 ml separable flask equipped with a stirrer, a thermometer and a condenser tube. Next, 79.4 g of a 48.8% aqueous sodium hydroxide solution (0.96 mol, 0.86 equivalents relative to the hydroxyl group of the partially degraded starch) was charged into the flask, and stirred at a temperature of 60° C. or less until the solution was completely homogeneous. After confirming that the solution had been homogeneous, 89.9 g of crystals of 6-bromohexanoic acid (0.46 mol, 0.4 equivalents relative to the hydroxyl group of the partially degraded starch) were added in portions at 50° C. to 60° C. over 30 minutes. After charging 6-bromohexanoic acid, the temperature was adjusted to 45° C. to 50° C. and the mixture was stirred for 10 hours. The end point of the reaction was determined by sampling the reaction liquid and measuring the bromide ion content in the reaction liquid by potentiometric titration with a 0.01 N silver nitrate solution, provided that the bromide ion content had reached 98% or more of the calculated bromide ion content of 9.8% which corresponds to a bromide ion content when all 6-bromohexanoic acid has reacted. In this Production Example, the bromine content was 10.1%.

After completion of the reaction, the reaction liquid was diluted with 250 g of ion-exchanged water. The diluted reaction liquid was cooled to room temperature and added to 1.6 L of ethanol over about 30 minutes to reprecipitate a glucose polymer. After adding all the reaction liquid, the mixture was stirred for 30 minutes, and the glucose polymer dispersed in ethanol was subjected to solid-liquid separation by filtration under reduced pressure.

Subsequently, in order to remove the sodium bromide contained in the glucose polymer, the collected glucose polymer was redispersed in 0.5 L of aqueous ethanol with an ethanol/water ratio of 90/10 (by volume), and was stirred and washed at room temperature for 30 minutes, followed by performing solid-liquid separation by filtration under reduced pressure to collect the glucose polymer again. The bromine content of the collected glucose polymer was measured by potentiometric titration with a 0.01 N silver nitrate solution, and the washing process was repeated until the bromide ion content was less than 1%. The resulting glucose polymer had a total acid value of 145 mg KOH/g and the degree of etherification as calculated from the total acid value was 0.64.

(4) Production of Water-Absorbing Resin (Production Example 32)

A 35 g portion of the glucose polymer obtained in Production Example 15 (a product containing hydrous methanol; wetness percentage: 65%) was placed in a 300 ml beaker, and 100 ml of hydrous methanol (methanol/water=80/20 (by volume)) was further added thereto to disperse the glucose polymer. A 3.7 ml portion of 1N hydrochloric acid was gradually added thereto with a measuring pipette while stirring with a magnetic stirrer. After adding hydrochloric acid, the mixture was stirred for 15 minutes and subjected to suction filtration under reduced pressure to collect the glucose polymer partially neutralized to a free acid. The collected glucose polymer was crystals containing a hydrous alcohol, the crystals were transferred to a petri dish, placed in a blower dryer set at 70° C., and dried for 12 hours for crosslinking treatment. During drying, methanol initially evaporated, and the glucose polymer once dissolved in water and became starch syrup-like, so that after drying, it was one spongy mass of solid. The spongy solid was pulverized with a mortar and sieved through sieves each having an opening of 150 μm and 850 μm to collect particles having a particle size of 150 to 850 μm.

The water-absorbing resin in each of Production Examples 33 to 53 and Production Example 60 was obtained by performing the same procedure as that in Production Example 32, except that the raw materials and the amount thereof to be charged were changed to those shown in Table 3.

TABLE 3

| Water-absorbing resin | Production Example 32 | Production Example 33 | Production Example 34 | Production Example 35 | Production Example 36 | Production Example 37 | Production Example 38 | Production Example 39 |
|---|---|---|---|---|---|---|---|---|
| Glucose polymer | Production Example 15 | Production Example 16 | Production Example 17 | Production Example 18 | Production Example 18 | Production Example 19 | Production Example 20 | Production Example 21 |
| Weight (g) | 35 | 45 | 50 | 27 | 25 | 45 | 45 | 35 |
| Wetness percentage (%) | 65 | 69 | 69 | 64 | 64 | 66 | 66 | 65 |
| Aqueous methanol (ml) | 100 | 120 | 125 | 123 | 122 | 120 | 123 | 123 |
| 1N hydrochloric acid (ml) | 3.7 | 4.9 | 2.3 | 1.7 | 3.1 | 4.8 | 2.3 | 2.4 |

| Water-absorbing resin | Production Example 40 | Production Example 41 | Production Example 42 | Production Example 43 | Production Example 44 | Production Example 45 | Production Example 46 | Production Example 47 |
|---|---|---|---|---|---|---|---|---|
| Glucose polymer | Production Example 21 | Production Example 22 | Production Example 23 | Production Example 24 | Production Example 25 | Production Example 26 | Production Example 27 | Production Example 28 |
| Weight (g) | 35 | 25 | 45 | 45 | 45 | 45 | 20 | 25 |
| Wetness percentage (%) | 65 | 67 | 68 | 63 | 73 | 60 | 69 | 66 |
| Aqueous methanol (ml) | 122 | 123 | 122 | 121 | 123 | 121 | 123 | 122 |
| 1N hydrochloric acid (ml) | 3.5 | 1.8 | 3.0 | 4.3 | 2.5 | 3.6 | 1.6 | 2.8 |

| Water-absorbing resin | Production Example 48 | Production Example 49 | Production Example 50 | Production Example 51 | Production Example 52 | Production Example 53 | Production Example 60 |
|---|---|---|---|---|---|---|---|
| Glucose polymer | Production Example 29 | Production Example 29 | Production Example 30 | Production Example 30 | Production Example 31 | Production Example 31 | Production Example 57 |
| Weight (g) | 25 | 25 | 25 | 25 | 27 | 27 | 25 |
| Wetness percentage (%) | 62 | 62 | 70 | 70 | 59 | 59 | 66 |
| Aqueous methanol (ml) | 122 | 123 | 122 | 123 | 123 | 122 | 83 |
| 1N hydrochloric acid (ml) | 1.9 | 2.8 | 1.5 | 2.2 | 2.2 | 3.3 | 1.0 |

Production Example 61

A 20 g portion of the glucose polymer obtained in Production Example 58 (a wet product containing hydrous acetone; wetness percentage: 61%) was placed in a 300 ml beaker, and 60 ml of hydrous acetone having a acetone/water ratio of 90/10 (by volume) was further added thereto to disperse the glucose polymer. A 19.3 ml portion of 1N NaOH was gradually added thereto with a measuring pipette while stirring with a magnetic stirrer. After adding the aqueous NaOH solution, the mixture was stirred for 15 minutes and subjected to suction filtration under reduced pressure to collect the glucose polymer having the carboxylic acid introduced by maleic anhydride partially neutralized to a sodium salt. The collected glucose polymer was wet crystals containing hydrous acetone. The wet crystals were transferred to a petri dish, placed in a blower dryer set at 70° C., and dried for 12 hours for crosslinking treatment. The solid obtained after the crosslinking treatment was pulverized with a mortar and sieved through sieves each having an opening of 150 μm and 850 μm to collect particles having a particle size of 150 to 850 μm.

Production Example 62

A 25 g portion of the glucose polymer (wet product) obtained in Production Example 59 (a wet product containing hydrous methanol; wetness percentage: 63%) was transferred to a petri dish, placed in a blower dryer set at 70° C., and dried for 12 hours for crosslinking treatment. The solid obtained after the crosslinking treatment was pulverized with a mortar and sieved through sieves each having an opening of 150 μm and 850 μm to collect particles having a particle size of 150 to 850 μm.

Production Example 65

A 25 g portion of the glucose polymer obtained in Production Example 64 (a wet product containing aqueous ethanol; wetness percentage: 61%) was placed in a 300 ml beaker, and 80 ml of aqueous ethanol (ethanol/water=90/10 (by volume)) was further added thereto to disperse the glucose polymer. A 12.1 ml portion of 1N hydrochloric acid was gradually added thereto with a measuring pipette while stirring with a magnetic stirrer. After adding hydrochloric acid, the mixture was stirred for 15 minutes and subjected to suction filtration under reduced pressure to collect the glucose polymer partially neutralized to a free acid. The collected glucose polymer was wet crystals containing a hydrous alcohol. The wet crystals were transferred to a petri dish, placed in a blower dryer set at 150° C., and dried for 1 hour for crosslinking treatment. The solid obtained after the crosslinking treatment was pulverized with a mortar and sieved through sieves each having an opening of 150 μm and 850 μm to collect particles having a particle size of 150 to 850 μm.

(5) Production of Water-Absorbing Resin (Comparative Production Examples 1 and 2)

A water-absorbing resin in Comparative Production Example 1 was produced, according to the protocol disclosed in Example 2 of Patent Literature 1 (U.S. Pat. No. 5,079,354), by carboxymethylating the corn starch, which had not been depolymerized, and heat drying under an alkaline condition.

A water-absorbing resin (hydrochloric acid-treated resin) in Comparative Production Example 2 was produced, according to the protocol disclosed in Example 1 (paragraphs [0146] to [0147]) of Patent Literature 2 (JP 2010-504414 T), by crosslinking potato starch, which had not been depolymerized, with epichlorohydrin followed by carboxymethylation.

(6) Viscosity Evaluation Method for Partially Degraded Starch

The viscosity of the partially degraded starch when subjected to mixing procedure with an aqueous NaOH solution was subjected to evaluation according to the following criteria. The mixing procedure was performed, at the charging ratio described for each of Production Examples 15 to 28, with a 500 ml separable flask equipped with a mechanical stirrer (three-one motor BL600 available from Shinto Scientific Co., Ltd.) with a glass anchor-type stirring blade (blade diameter: 60 mm). The evaluation results are shown in Table 4.

Good: The liquid had a low viscosity and was able to be homogeneously mixed.

Average: The liquid had a high viscosity or the liquid was increased in viscosity during mixing, so that it was not able to be mixed homogeneously.

Poor: The liquid had a high viscosity or the liquid was increased in viscosity during mixing, so that it was not able to be mixed.

(7) Evaluation Method for Glucose Polymer (7-1) Total Acid Value of Glucose Polymer A method for measuring the total acid value of a glucose polymer having a carboxymethyl group as an acidic group will be now described. About 0.3 g of each glucose polymer was precisely weighed into a 100 ml beaker and dissolved in 40 ml of ion-exchanged water. The resulting aqueous solution was set in a potentiometric titrator (AT-610, available from Kyoto Electronics Manufacturing Co., Ltd.) equipped with glass electrodes (C-171, available from Kyoto Electronics Manufacturing Co., Ltd.). When all of carboxylic acid groups in a sample are in the form of a sodium salt, the potential at this stage exhibits approximately 30 mV or less. Therefore, 1N hydrochloric acid was added until the potential reaches 320 mV or more to convert all of the carboxylic acid groups in the glucose polymer to a free acid (resulting in excess of hydrochloric acid). After confirming that the potential had been 320 mV or more, neutralization titration was performed with a 0.1 N aqueous NaOH solution. In this titration, two inflection points were detected, the first inflection point near 220 mV and the second inflection point near 0 to −30 mV. The former is the neutralization point of excess hydrochloric acid in the sample and the latter is the neutralization point of the carboxylic acid in the glucose polymer. Therefore, the total acid value is calculated by the following equation 1:

$$\text{Total acid value (mg KOH/g)}=[\{(Vb-Va)\times 0.1\times fa\times 56.11\}\div Sa]/(1-wr) \quad \text{(Equation 1)}$$

wherein:

Va is the volume of 0.1N NaOH consumed up to the first inflection point (ml);

Vb is the volume (ml) of 0.1N NaOH consumed up to the second inflection point;

fa is 0.1N NaOH titer;

Sa is the amount of sample collected; and wr is the wetness percentage of the glucose polymer measured by the method described later.

(7-2) Degree of Etherification of Glucose Polymer

The degree of etherification of the water-soluble polymer is calculated using the value of the total acid value by following equation 2:

$$\text{Degree of etherification}=(162\times TAV)=(56{,}100-80\times TAV) \quad \text{(Equation 2)}$$

wherein TAV is the total acid value (unit: mg KOH/g) of the glucose polymer.

(7-3) Wetness Percentage of Glucose Polymer

"The wetness percentage" refers to the rate (%) of reduction in weight relative to the initial weight of a sample when the sample is dried at a drying temperature of 130° C. with a halogen moisture meter. In this example, 0.5 to 1.0 g of each glucose polymer was set in a halogen moisture meter HC103 available from Mettler Toledo and subjected to measurement at a drying temperature of 130° C. and the switch-off standard of 1 mg/50 seconds and in % MC mode (a mode in which MC Value÷(initial weight of sample−dry weight of sample)÷initial weight of sample×100 is displayed). The displayed MC value was taken as the wetness percentage.

(7-4) Free Acid Value of Glucose Polymer

The free acid value is the acid value defined when the crosslinking of the glucose polymer has been performed by acid treatment. In the Examples, since the crosslinked polymer is produced continuously after the acid treatment and direct quantification by titration is thereby difficult, the value calculated by the following calculation equation is defined as the free acid value. Since the acid treatment is performed with an acid having a pKa lower than the carboxylic acid of the glucose polymer, the amount of acid added during the acid treatment is substantially equal to the free acid value. Therefore, the free acid value is calculated by the following equation 3 below.

$$\text{Free acid value (mg KOH/g)}=(Vc\times N\times fb\times 56.11)\div Sb \quad \text{(Equation 3)}$$

wherein:

Vc is the volume (ml) of the acid aqueous solution used for the acid treatment;

N is the normality of the acid aqueous solution;

fb is the titer of the aqueous acid solution; and

Sb is the weight (pure content) of the glucose polymer charged during the acid treatment.

(8) Evaluation Method for Water-Absorbing Resin (8-1) Water Absorption Rate Under No Pressure (for Physiological Saline)

A 1.0 g portion of each measurement sample was put in a tea bag (20 cm long×10 cm wide) made of a nylon mesh having an opening of 63 μm (JIS Z8801-1: 2006), immersed in 1,000 ml of physiological saline (having a salt concentration of 0.9% by weight) for 3 hours without stirring. Thereafter, the tea bag was hung for 10 minutes for draining. The weight (h1) including that of the tea bag was measured, and the water retention amount was determined from the following equation. Each of the temperatures of physiological saline used and the measurement atmosphere was 25° C.±2° C.

$$FSC\ (g/g)=(h1)-(h2)$$

Herein, (h2) is the weight of the tea bag, not containing the measurement sample, measured by performing the same operation as above. FSC is an abbreviation for Free Swell Capacity and means a free swelling rate, and refers to a water absorption rate under no pressure.

(8-2) Water Absorption Rate Under No Pressure (for Ion-Exchanged Water)

The weight (h1') including that of the tea bag after immersion was measured and the water retention amount was determined in the manner as when determining the water absorption rate under no pressure (for physiological saline), except that 0.2 g of the measurement sample was put in a tea bag and ion-exchanged water was used instead of physiological saline). (h2') is the weight of the tea bag not containing the measurement sample, measured by performing the same operation as above.

$$FSC\ (g/g)=\{(h1')-(h2')\}/0.2$$

(8-3) Water Retention Rate (for Physiological Saline)

After measuring the water absorption rate under no pressure described above, the tea bag as such was placed in a centrifuge and dehydrated by centrifugation at 150 G for 90 seconds to remove an excess liquid component. The weight (h3) including that of the tea bag was measured and the water retention amount was determined from the following equation.

$$CRC\ (g/g)=(h3)-(h4)$$

Herein, (h4) is the weight of the tea bag not containing the measurement sample, measured by performing the same operation as above. CRC is an abbreviation for Centrifuge Retention Capacity and means a centrifugation retention capacity, and refers to a water retention rate.

(8-4) Water Retention Rate (for Ion-Exchanged Water)

After measuring the water absorption rate under no pressure described above, the tea bag containing the sample was placed in a centrifuge and dehydrated by centrifugation at 150 G for 90 seconds to remove an excess liquid component. The weight (h3') including that of the tea bag was measured and the water retention amount was determined from the following equation.

$$CRC\ (g/g)=\{(h3')-(h4')\}/0.2$$

Herein, (h4') is the weight of the tea bag not containing the measurement sample, measured by performing the same operation as above.

(8-5) Alkali Solubility

A 0.5 g portion of a water-absorbing resin and 9.5 g of a 1% aqueous NaOH solution were weighed into a 13.5 ml screw tube bottle, suspended with a mix rotor, and stirred for 60 minutes. Then, 30-mesh wire mesh of about 50 mm×50 mm square (opening: 500 μm) was provided, and the weight of the wire mesh (Wm1) was measured. The mixed liquid was subjected to natural filtration with the weighed wire mesh, and after filtration, the mesh was washed with about 5 ml of ion-exchanged water. After washing, the wire mesh was dried with a blower dryer at 120° C. for 2 hours, the weight of the wire mesh after drying (Wm2) was measured, and the 30-mesh pass residue was calculated by the following equation 4. When the water-absorbing resin is completely dissolved, the 30-mesh pass residue is 0%, and when it is not dissolved and gel remains, the 30-mesh pass value exceeds 0%.

$$\text{30-Mesh pass residue (\%)}=(Wm2-Wm1)/0.5\times100 \quad \text{(Equation 4)}$$

(8-6) Alkali Degradability

About 5 g of the water-absorbing gel after the water retention rate test with physiological saline is charged in a 200 ml beaker, and several drops of a 48.8% aqueous NaOH solution are added from above. Thereafter, the mixture was stirred with a stainless-steel spatula, and spread thinly on the bottom of the beaker to visually confirm the state of dissolution. When the gel state was lost and a clear solution with no insoluble matter was obtained, it was evaluated as "dissolved", and when the gel state was maintained or insoluble matters remained even partially, it was evaluated as "not dissolved".

(9) Evaluation of Water-Absorbing Resin (Examples 1 to 26 and Comparative Examples 1 and 2)

Water absorption performance, alkali degradability and alkali solubility (turbidity, 30-mesh pass residue) were measured for the water-absorbing resins obtained in each of Production Examples 32 to 53, Production Examples 60 to 62, Production Example 65, and Comparative Production Examples 1 and 2. The results are shown in Table 4.

TABLE 4

| | | Example 1 | Example 2 | Example 3 | Example 4 | Example 5 | Example 6 | Example 7 |
|---|---|---|---|---|---|---|---|---|
| Partially hydrolyzed starch 1 | | Production Example 1 | Production Example 2 | Production Example 3 | Production Example 4 | Production Example 4 | Production Example 5 | Production Example 6 |
| glucose polymer | | Production Example 15 | Production Example 16 | Production Example 17 | Production Example 18 | Production Example 18 | Production Example 19 | Production Example 20 |
| Water-absorbing resin | | Production Example 32 | Production Example 33 | Production Example 34 | Production Example 35 | Production Example 36 | Production Example 37 | Production Example 38 |
| Type of starch | | Corn starch | Corn starch | Corn starch | Corn starch | Corn starch | Tapioca | Tapioca |
| Crosslinking (acid) | | HCl | HCl | HCl | HCl | HCl | HCl | HCl |
| Partially hydrolyzed starch 1 | Mw($\times10^6$) | 0.81 | 0.6 | 0.72 | 1.46 | 1.46 | 0.20 | 1.18 |
| | Mw/Mn | 6.4 | 7.4 | 8.7 | 9.8 | 9.8 | 2.9 | 22.6 |
| Partially hydrolyzed starch 2 | | — | — | — | — | — | — | — |
| | Amount used (% by mass) | 0 | 0 | 0 | 0 | 0 | 0 | 0 |
| | Mw($\times10^6$) | — | — | — | — | — | — | — |
| | Mw/Mn | — | — | — | — | — | — | — |
| Counter cation | | Sodium | Sodium | Sodium | Sodium | Sodium | Sodium | Sodium |
| Physical properties of glucose polymer | Mw($\times10^6$) | 3.4 | 2.0 | 2.3 | 4.0 | 4.0 | 0.8 | 5.3 |
| | Mw/Mn | 9.3 | 8.7 | 8.5 | 7.2 | 7.2 | 10.1 | 16.8 |
| | Total acid value (mgKOH/g) | 182 | 170 | 180 | 161 | 161 | 142 | 165 |
| | Degree of etherification | 0.71 | 0.65 | 0.70 | 0.60 | 0.60 | 0.51 | 0.62 |
| | Free acid value (mgKOH/g) | 17 | 22 | 11 | 11 | 22 | 17 | 8 |
| | Viscosity | Good | Good | Good | Good | Good | Good | Good |
| Absorption performance | Ion-exchanged water FSC | 179 | 140 | 216 | 227 | 156 | 212 | 268 |
| | Ion-exchanged water CRC | 147 | 112 | 131 | 160 | 127 | 154 | 172 |
| | Physiological saline FSC | 43 | 36 | 34 | 51 | 41 | 42 | 63 |
| | Physiological saline CRC | 39 | 33 | 29 | 44 | 38 | 36 | 55 |
| Degradability | | Dissolved | Dissolved | Dissolved | Dissolved | Dissolved | Dissolved | Dissolved |
| Alkali solubility (turbidity mg/L) | | 3.3 | 3.4 | 3.4 | 2.9 | 3.9 | 1.4 | 2.6 |
| Alkali solubility (30-mesh pass residue %) | | 0 | 0 | 0 | 0 | 0 | 0 | 0 |

TABLE 4-continued

| | | Example 8 | Example 9 | Example 10 | Example 11 | Example 12 | Example 13 | Example 14 |
|---|---|---|---|---|---|---|---|---|
| Partially hydrolyzed starch 1 | | Production Example 7 | Production Example 7 | Production Example 7 | Production Example 8 | Production Example 8 | Production Example 9 | Production Example 10 |
| glucose polymer | | Production Example 21 | Production Example 21 | Production Example 22 | Production Example 23 | Production Example 24 | Production Example 25 | Production Example 26 |
| Water-absorbing resin | | Production Example 39 | Production Example 40 | Production Example 41 | Production Example 42 | Production Example 43 | Production Example 44 | Production Example 45 |
| Type of starch | | Tapioca | Tapioca | Tapioca | Waxy | Waxy | Waxy | Potato |
| Crosslinking (acid) | | HCl | HCl | HCl | HCl | HCl | HCl | HCl |
| Partially hydrolyzed starch 1 | Mw(×$10^6$) | 1.96 | 1.96 | 1.96 | 0.61 | 0.61 | 1.33 | 1.53 |
| | Mw/Mn | 8.0 | 8.0 | 8.0 | 35.2 | 35.2 | 19.1 | 9.9 |
| Partially hydrolyzed starch 2 | | — | — | Production Example 13 | — | — | — | — |
| | Amount used (% by mass) | 0 | 0 | 10 | 0 | 0 | 0 | 0 |
| | Mw(×$10^6$) | — | — | 0.19 | — | — | — | — |
| | Mw/Mn | — | — | 2.94 | — | — | — | — |
| Counter cation | | Sodium | Sodium | Sodium | Sodium | Sodium | Sodium | Sodium |
| Physical properties of glucose polymer | Mw(×$10^6$) | 11.5 | 11.5 | 9.4 | 1.6 | 2.3 | 4.5 | 9.3 |
| | Mw/Mn | 19.3 | 19.3 | 25.3 | 7.4 | 22.3 | 14.6 | 20.9 |
| | Total acid value (mgKOH/g) | 170 | 170 | 172 | 71 | 192 | 191 | 162 |
| | Degree of etherification | 0.65 | 0.65 | 0.66 | 0.23 | 0.76 | 0.76 | 0.61 |
| | Free acid value (mgKOH/g) | 8 | 11 | 11 | 11 | 17 | 8 | 17 |
| | Viscosity | Good | Good | Good | Good | Good | Good | Good |
| Absorption performance | Ion-exchanged water FSC | 331 | 185 | 289 | 152 | 171 | 251 | 228 |
| | Ion-exchanged water CRC | 186 | 152 | 184 | 122 | 130 | 145 | 182 |
| | Physiological saline FSC | 64 | 44 | 58 | 23 | 29 | 53 | 48 |
| | Physiological saline CRC | 50 | 41 | 51 | 21 | 27 | 42 | 44 |
| Degradability | | Dissolved | Dissolved | Dissolved | Dissolved | Dissolved | Dissolved | Dissolved |
| Alkali solubility (turbidity mg/L) | | 4.3 | 3.6 | 4.5 | 9.5 | 4.5 | 5.6 | 2.9 |
| Alkali solubility (30-mesh pass residue %) | | 0 | 0 | 0 | 0 | 0 | 0 | 0 |

| | | Example 15 | Example 16 | Example 17 | Example 18 | Example 19 | Example 20 | Example 21 |
|---|---|---|---|---|---|---|---|---|
| Partially hydrolyzed starch 1 | | Production Example 11 | Production Example 12 | — | — | — | — | — |
| glucose polymer | | Production Example 27 | Production Example 28 | Production Example 29 | Production Example 29 | Production Example 30 | Production Example 30 | Production Example 31 |
| Water-absorbing resin | | Production Example 46 | Production Example 47 | Production Example 48 | Production Example 49 | Production Example 50 | Production Example 51 | Production Example 52 |
| Type of starch | | Corn starch | Corn starch | Waxy | Waxy | Corn starch | Corn starch | Tapioca |
| Crosslinking (acid) | | HCl | HCl | HCl | HCl | HCl | HCl | HCl |
| Partially hydrolyzed starch 1 | Mw(×$10^6$) | 1.46 | 1.04 | — | — | — | — | — |
| | Mw/Mn | 9.8 | 10.6 | — | — | — | — | — |
| Partially hydrolyzed starch 2 | | Production Example 14 | — | — | — | — | — | — |
| | Amount used (% by mass) | 10 | 0 | 0 | 0 | 0 | 0 | 0 |
| | Mw(×$10^6$) | 0.27 | — | — | — | — | — | — |
| | Mw/Mn | 4.40 | — | — | — | — | — | — |
| Counter cation | | Sodium | Potassium | Sodium | Sodium | Sodium | Sodium | Sodium |
| Physical properties of glucose polymer | Mw(×$10^6$) | 3.4 | 1.9 | 20.4 | 20.4 | 45.5 | 45.5 | 48.6 |
| | Mw/Mn | 16.1 | 11.2 | 21.6 | 21.6 | 77.7 | 77.7 | 34.7 |
| | Total acid value (mgKOH/g) | 134 | 138 | 161 | 161 | 155 | 155 | 150 |
| | Degree of etherification | 0.48 | 0.50 | 0.61 | 0.61 | 0.57 | 0.5 | 0.55 |
| | Free acid value (mgKOH/g) | 11 | 17 | 11 | 17 | 11 | 17 | 11 |
| | Viscosity | Good | Good | Good | Good | Average | Average | Average |
| Absorption performance | Ion-exchanged water FSC | 216 | 233 | 215 | 125 | 191 | 242 | 271 |
| | Ion-exchanged water CRC | 160 | 140 | 172 | 97 | 159 | 191 | 229 |
| | Physiological saline FSC | 52 | 47 | 47 | 34 | 39 | 45 | 45 |
| | Physiological saline CRC | 46 | 39 | 45 | 31 | 37 | 43 | 43 |
| Degradability | | Dissolved | Dissolved | Dissolved | Dissolved | Dissolved | Dissolved | Dissolved |
| Alkali solubility (turbidity mg/L) | | 1.8 | 4.6 | 2.9 | 2.0 | 28.5 | 29.8 | 60.4 |
| Alkali solubility (30-mesh pass residue %) | | 0 | 0 | 0 | 0 | 0 | 0 | 0 |

| | | Example 22 | Example 23 | Example 24 | Example 25 | Example 26 | Comparative Example 1 | Comparative Example 2 |
|---|---|---|---|---|---|---|---|---|
| Partially hydrolyzed starch 1 | | — | Production Example 54 | Production Example 55 | Production Example 56 | Production Example 63 | | |
| glucose polymer | | Production Example 31 | Production Example 57 | Production Example 58 | Production Example 59 | Production Example 64 | Comparative Production Example 1 | Comparative Production Example 2 |
| Water-absorbing resin | | Production Example 53 | Production Example 60 | Production Example 61 | Production Example 62 | Production Example 65 | | |

TABLE 4-continued

| Type of starch | | Tapioca | Corn starch | Corn starch | Corn starch | Corn starch | Corn starch | Potato |
|---|---|---|---|---|---|---|---|---|
| Crosslinking (acid) | | HCl | HCl | NaOH | NaOH | NaOH | None | (Epichloro-hydrin) |
| Partially hydrolyzed starch 1 | Mw($\times10^6$) | — | 6.07 | 1.34 | 1.37 | 1.91 | — | — |
| | Mw/Mn | — | 35.4 | 10.6 | 65.6 | 10.1 | — | — |
| Partially hydrolyzed starch 2 | | — | — | — | — | — | — | — |
| | Amount used (% by mass) | 0 | 0 | 0 | 0 | 0 | — | — |
| | Mw($\times10^6$) | — | — | — | — | — | — | — |
| | Mw/Mn | — | — | — | — | — | — | — |
| Counter cation | | Sodium | Sodium | Sodium | Sodium | Sodium | Sodium | Sodium |
| Physical properties of glucose polymer | Mw($\times10^6$) | 48.7 | 45.6 | 3.1 | 3.7 | 4.8 | — | — |
| | Mw/Mn | 34.7 | 104.9 | 39.6 | 13.8 | 14.0 | — | — |
| | Total acid value (mgKOH/g) | 150 | 154 | 90 | 138 | 145 | — | — |
| | Degree of etherification | 0.55 | 0.57 | 0.32(*1) | 0.57(*2) | 0.64 | — | — |
| | Free acid value (mgKOH/g) | 17 | 11 | 17 | 37 | 11 | — | — |
| | Viscosity | Average | Good | Good | Good | Good | Average | Average |
| Absorption performance | Ion-exchanged water FSC | 213 | 143 | 40 | 160 | 62 | 69 | 292 |
| | Ion-exchanged water CRC | 178 | 112 | 21 | 63 | 39 | 21 | 81 |
| | Physiological saline FSC | 41 | 27 | 11 | 25 | 20 | 15 | 29 |
| | Physiological saline CRC | 38 | 24 | 7 | 22 | 14 | 5 | 26 |
| Degradability | | Dissolved | Dissolved | Dissolved | Dissolved | Dissolved | Not dissolved | Not dissolved |
| Alkali solubility (turbidity mg/L) | | 50.0 | 4.1 | 2.6 | 2.5 | 3.8 | 24.4 | 89.5 |
| Alkali solubility (30-mesh pass residue %) | | 0 | 0 | 0 | 0 | 0 | 2 | 43 |

(*1)Degree of esterification by maleic anhydride = (162*Total acid value(mgKOH/g))/(56100 − 120*Total acid value(mgKOH/g))
(*2)Degree of esterification by succinic anhydride = (162*Total acid value(mgKOH/g))/(56100 − 122*Total acid value(mgKOH/g))

As shown in Table 4, the water-absorbing resins in Examples 1 to 26 were superior in water absorption performance to those in Comparative Examples 1 and 2. The glucose polymer used as a raw material in each of Examples 1 to 16 and Example 23 to 26 was lower in viscosity and was more excellent in operability during the production of water-absorbing resins than those in Comparative Examples 1 and 2.

In the alkali solubility test of the water-absorbing resin, in each of Examples 1 to 26, no residue remained on the wire mesh and the sieve residue was less than 1%, indicating that it was excellent in alkali solubility. In contrast, a sieve residue was about 2% in Comparative Example 1 and about 43% in Comparative Example 2, and some gels and insolubles remained. In Comparative Example 1, the solution that had passed through the sieve was almost slime-like.

(10) Chemical Composition of Glucose Polymer and Water-Absorbing Resin

Figure 2:
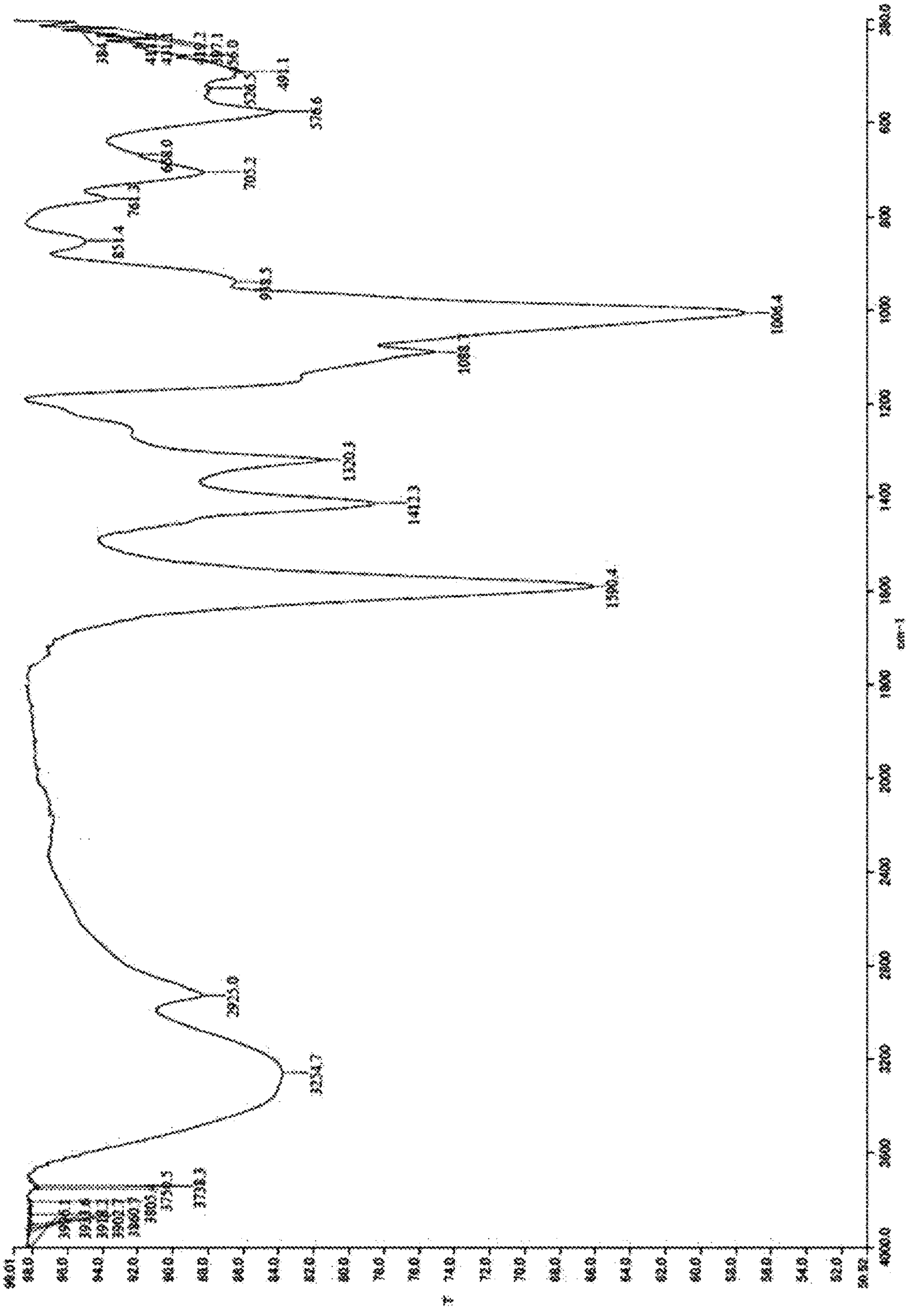
FIG. 2 shows the FT-IR spectrum of the water-absorbing resin of Production Example 32.

The chemical composition of each of the glucose polymer of Production Example 15 and the water-absorbing resin of Production Example 32 was analyzed by the FT-IR: ATR method. FIGS. 1 and 2 show FT-IR spectra. In the glucose polymer of Production Example 15 (FIG. 1) and the water-absorbing resin of Production Example 32 (FIG. 2) obtained by crosslinking this glucose polymer, no change was observed for the peaks of the ester bond (around 1720 $cm^{-1}$) and the ether bond (around 1020 $cm^{-1}$) and substantially no covalent crosslinking occurred.

The invention claimed is:

1. A water-absorbing resin, which is a crosslinked product of a glucose polymer and forms a physical gel upon absorption of water, wherein the glucose polymer is a starch with an acidic group introduced therein, and wherein when the water-absorbing resin is suspended in an aqueous solution of 1% sodium hydroxide so that a final concentration of the water-absorbing resin is 5% by weight, stirred for 60 minutes, followed by being sieved through a sieve having an opening of 500 μm, a dry weight of the water-absorbing resin remaining on the sieve is less than 2% by weight of a dry weight of the water-absorbing resin contained in the aqueous solution.

2. The water-absorbing resin according to claim 1, wherein the acidic group is an acidic group having a carboxyl group or a sulfonyl group.

3. The water-absorbing resin according to claim 1, wherein the acidic group is a carboxyalkyl group, a carboxyalkenyl group, or a sulfoalkyl group.

4. The water-absorbing resin according to claim 1, wherein the acidic group is a carboxymethyl group, a carboxyethyl group, a carboxyethenyl group, or a sulfoethyl group.

5. The water-absorbing resin according to claim 1, wherein the water-absorbing resin having one or more properties selected from the group consisting of:

a water absorption rate under no pressure for ion-exchanged water is in a range from 100 to 400 g/g, a water retention rate for ion-exchanged water is in a range from 80 to 300 g/g, a water absorption rate under no pressure for physiological saline is in a range from 20 to 70 g/g, and a water retention rate for physiological saline is in a range from 7 to 60 g/g.

6. The water-absorbing resin according to claim 1, wherein the water-absorbing resin has a ratio (A/B) of a water absorption rate under no pressure for ion-exchanged water (A) to a water absorption rate under no pressure for physiological saline (B) of 7 or less.

7. The water-absorbing resin according to claim 1, wherein the water-absorbing resin further comprises one or more compounds selected from the group consisting of water and a hydrophilic solvent, and a content of the one or more compounds in the water-absorbing resin is in a range from 0.1 to 10%.

8. A method for degrading the water-absorbing resin according to claim 1, comprising subjecting the water-absorbing resin to alkali treatment.

9. An article comprising the water-absorbing resin according to claim 1.

10. The water-absorbing resin according to claim 1, wherein the acidic group is a carboxyalkyl group with 1 to 8 carbon atoms or a carboxyalkenyl group with 2 to 8 carbon atoms.

11. A water-absorbing resin, which is a crosslinked product of a glucose polymer, the water-absorbing resin forming a physical gel upon absorption of water, wherein the glucose polymer is a partially degraded starch having a weight-average molecular weight in a range from 50,000 to 7,500,000, with an acidic group introduced therein.

12. The water-absorbing resin according to claim 11, wherein when the water-absorbing resin is suspended in an aqueous solution of 1% sodium hydroxide so that a final concentration of the water-absorbing resin is 5% by weight, stirred for 60 minutes, followed by being sieved through a sieve having an opening of 500 μm, a dry weight of the water-absorbing resin remaining on the sieve is less than 2% by weight of a dry weight of the water-absorbing resin contained in the aqueous solution.

13. The water-absorbing resin according to claim 11, wherein the acidic group is an acidic group having a carboxyl group or a sulfonyl group.

14. The water-absorbing resin according to claim 11, wherein the acidic group is a carboxyalkyl group, a carboxyalkenyl group, or a sulfoalkyl group.

15. The water-absorbing resin according to claim 11, wherein the acidic group is a carboxymethyl group, a carboxyethyl group, a carboxyethenyl group, or a sulfoethyl group.

16. The water-absorbing resin according to claim 11, wherein the water-absorbing resin has one or properties selected from the group consisting of:

a water absorption rate under no pressure for ion-exchanged water is in a range from 100 to 400 g/g, a water retention rate for ion-exchanged water is in a range from 80 to 300 g/g, a water absorption rate under no pressure for physiological saline is in a range from 20 to 70 g/g, and a water retention rate for physiological saline is in a range from 7 to 60 g/g.

17. The water-absorbing resin according to claim 11, wherein the water-absorbing resin has a ratio (A/B) of a water absorption rate under no pressure for ion-exchanged water (A) to a water absorption rate under no pressure for physiological saline (B) of 7 or less.

18. The water-absorbing resin according to claim 11, wherein the water-absorbing resin further comprises one or more compounds selected from the group consisting of water and a hydrophilic solvent, and a content of the one or more compounds in the water-absorbing resin is in a range from 0.1 to 10%.

19. A method for degrading the water-absorbing resin according to claim 11, comprising subjecting the water-absorbing resin to alkali treatment.

20. An article comprising the water-absorbing resin according to claim 11.

* * * * *